United States Patent
Yonezawa et al.

(10) Patent No.: US 10,232,772 B2
(45) Date of Patent: Mar. 19, 2019

(54) DRIVER ASSISTANCE SYSTEM

(71) Applicant: MITSUBISHI ELECTRIC CORPORATION, Tokyo (JP)

(72) Inventors: Eisuke Yonezawa, Tokyo (JP); Masahiro Abukawa, Tokyo (JP); Naoyuki Tsushima, Tokyo (JP); Michinori Yoshida, Tokyo (JP); Shu Murayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/555,057

(22) PCT Filed: Mar. 26, 2015

(86) PCT No.: PCT/JP2015/001742
§ 371 (c)(1),
(2) Date: Aug. 31, 2017

(87) PCT Pub. No.: WO2016/151638
PCT Pub. Date: Sep. 29, 2016

(65) Prior Publication Data
US 2018/0037162 A1 Feb. 8, 2018

(51) Int. Cl.
*B60Q 1/00* (2006.01)
*B60Q 9/00* (2006.01)
(Continued)

(52) U.S. Cl.
CPC ........... *B60Q 9/008* (2013.01); *G08G 1/0112* (2013.01); *G08G 1/0129* (2013.01);
(Continued)

(58) Field of Classification Search
CPC ........... G01S 13/931; G01S 2013/9357; G01S 2013/936; G08G 1/16; G08G 1/166; B60R 2300/8093
(Continued)

(56) References Cited

U.S. PATENT DOCUMENTS

| 5,955,941 A | 9/1999 | Pruksch et al. |
| 7,151,467 B2 | 12/2006 | Fujita et al. |

(Continued)

FOREIGN PATENT DOCUMENTS

| JP | 10-166895 A | 6/1998 |
| JP | 11-222113 A | 8/1999 |

(Continued)

*Primary Examiner* — Daryl C Pope
(74) *Attorney, Agent, or Firm* — Birch, Stewart, Kolasch & Birch, LLP

(57) ABSTRACT

A driver assistance system according to the present invention has an other-vehicle information acquisition unit that acquires travel direction information of an other-vehicle; a storage unit in which a spot where the visibility of a driver in a vehicle is reduced and information on a direction, associated with the spot, in which the visibility of the driver of the vehicle is reduced are stored in association with each other; a visibility determination unit that determines whether or not the visibility of a driver in the other-vehicle is reduced on the basis of the travel direction information acquired by the other-vehicle information acquisition unit and the information on the direction in which the visibility is reduced stored in the storage unit; and a warning processing unit that warns a driver of an own-vehicle that the visibility of the driver in the other-vehicle is reduced if the visibility determination unit determines that the visibility of the driver in the other-vehicle is reduced.

7 Claims, 20 Drawing Sheets

(51) Int. Cl.
*G08G 1/056* (2006.01)
*G08G 1/01* (2006.01)
*G08G 1/0967* (2006.01)
*G08G 1/16* (2006.01)

(52) U.S. Cl.
CPC .......... *G08G 1/0141* (2013.01); *G08G 1/056* (2013.01); *G08G 1/09675* (2013.01); *G08G 1/096716* (2013.01); *G08G 1/096775* (2013.01); *G08G 1/164* (2013.01)

(58) Field of Classification Search
USPC ........ 340/435, 471, 901, 903, 905; 701/300, 701/301
See application file for complete search history.

(56) References Cited

U.S. PATENT DOCUMENTS

| | | |
|---|---|---|
| 8,903,603 B2 | 12/2014 | Ogata et al. |
| 2005/0156756 A1 | 7/2005 | Fujita et al. |
| 2013/0018547 A1 | 1/2013 | Ogata et al. |
| 2016/0046237 A1 | 2/2016 | Sugimoto et al. |

FOREIGN PATENT DOCUMENTS

| | | |
|---|---|---|
| JP | 11-296799 A | 10/1999 |
| JP | 2002-181554 A | 6/2002 |
| JP | 2003-121159 A | 4/2003 |
| JP | 2004-17731 A | 1/2004 |
| JP | 2004-191093 A | 7/2004 |
| JP | 2005-62060 A | 3/2005 |
| JP | 2005-196651 A | 7/2005 |
| JP | 2006-268475 A | 10/2006 |
| JP | 2006-277538 A | 10/2006 |
| JP | 2008-52453 A | 3/2008 |
| JP | 2008-70998 A | 3/2008 |
| JP | 2008-210058 A | 9/2008 |
| JP | 2009-37493 A | 2/2009 |
| JP | 2009-269461 A | 11/2009 |
| JP | 2011-118601 A | 6/2011 |
| JP | 2011-158281 A | 8/2011 |
| JP | 2012-68040 A | 4/2012 |
| JP | 2013-20417 A | 1/2013 |
| JP | 2013-54545 A | 3/2013 |
| JP | 2013-97677 A | 5/2013 |
| JP | 2014-178971 A | 9/2014 |
| JP | 2014-203186 A | 10/2014 |
| WO | WO 2014/167701 A1 | 10/2014 |

| DATE | TIME PERIOD | COORDINATES | ORIENTATION | DEGREE OF GLARE |
|---|---|---|---|---|
| 1/1 | 7:00-8:00 | 34.40N, 132.47E | 120°, 240° | 100%, 30% |
| 1/1 | 8:00-9:00 | 34.40N, 132.47E | 130°, 230° | 90%, 35% |
| 1/1 | 9:00-10:00 | 34.40N, 132.47E | 140°, 220° | 80%, 40% |
| ... | | | | |
| 9/3 | 7:00-8:00 | 34.40N, 132.47E | NO DATA | NO DATA |

Fig.14

| POSITION OF OWN-VEHICLE | ROAD DIRECTION | ALLOWED TRAVEL DIRECTION |
|---|---|---|
| 34.40N, 132.47E | 30°, 120°, 210°, 300° | 0, 0, -1, 1 |
| 35.25N, 138.63E | 40°, 130°, 230° | 0, 0, 0 |
| ⋮ | ⋮ | ⋮ | ant
DRIVER ASSISTANCE SYSTEM

TECHNICAL FIELD

The present invention relates to a driver assistance system that detects that the visibility of a driver in a vehicle is reduced and provides a warning.

BACKGROUND ART

Conventionally, there is disclosed a driver assistance device that calculates the position of the sun on the basis of the position of an own-vehicle and the current time, and further calculates the direction in which sunlight enters a driver's seat on the basis of the position of the sun and the travel direction of the own-vehicle (for example, see Patent Literature 1). This driver assistance device can warn in advance that the visibility of the driver in the own-vehicle is reduced by calculating the direction in which the sunlight enters the driver's seat.

CITATION LIST

Patent Literature

Patent Literature 1: JP 2003-121159 A

SUMMARY OF INVENTION

Technical Problem

However, although the driver assistance system described in Patent Literature 1 can detect that the visibility of the driver in the own-vehicle is reduced, it cannot detect that the visibility of a driver in an other-vehicle is reduced. Therefore, a problem is that even if the visibility of the driver in the own-vehicle is not reduced, if the visibility of the driver in the other-vehicle is reduced, there is a possibility that the other-vehicle may collide with the own-vehicle.

A driver assistance system according to the present invention has been made to solve the above-described problem, and aims to detect that the visibility of a driver in an other-vehicle is reduced and warn a driver in an own-vehicle.

Solution to Problem

A driver assistance system according to the present invention includes:

an other-vehicle information acquisition unit to acquire travel direction information of an other-vehicle;

a storage unit in which a spot where visibility of a driver in a vehicle is reduced and information on a direction, associated with the spot, in which the visibility of the driver in the vehicle is reduced are stored in association with each other;

a visibility determination unit to determine whether or not visibility of a driver in the other-vehicle is reduced on a basis of the travel direction information of the other-vehicle acquired by the other-vehicle information acquisition unit and the information on the direction in which the visibility is reduced stored in the storage unit; and a warning processing unit to, if the visibility determination unit determines that the visibility of the driver in the other-vehicle is reduced, warn a driver of an own-vehicle that the visibility of the driver in the other-vehicle is reduced.

A driver assistance system according to the present invention includes:

a visibility reduction spot determination unit to determine whether or not visibility of a driver in a vehicle is reduced, and when the visibility of the driver in the vehicle is reduced, output position information of the vehicle and travel direction information of the vehicle; and a storage unit to store the position information of the vehicle and the travel direction information of the vehicle that are output from the visibility reduction spot determination unit in association with each other.

Advantageous Effects of Invention

A driver assistance system according to the present invention detects that the visibility of a driver in an other-vehicle is reduced and warns a driver in an own-vehicle, so that if the visibility of the driver in the other-vehicle is reduced, the driver of the own-vehicle can pay attention to the movement of the other-vehicle while driving.

BRIEF DESCRIPTION OF DRAWINGS

FIG. 14 is an example of a map database according to the second embodiment;

DESCRIPTION OF EMBODIMENTS

First Embodiment

A driver assistance system according to a first embodiment will be described below with reference to FIG. 1 and FIG. 2.

Figure 1:
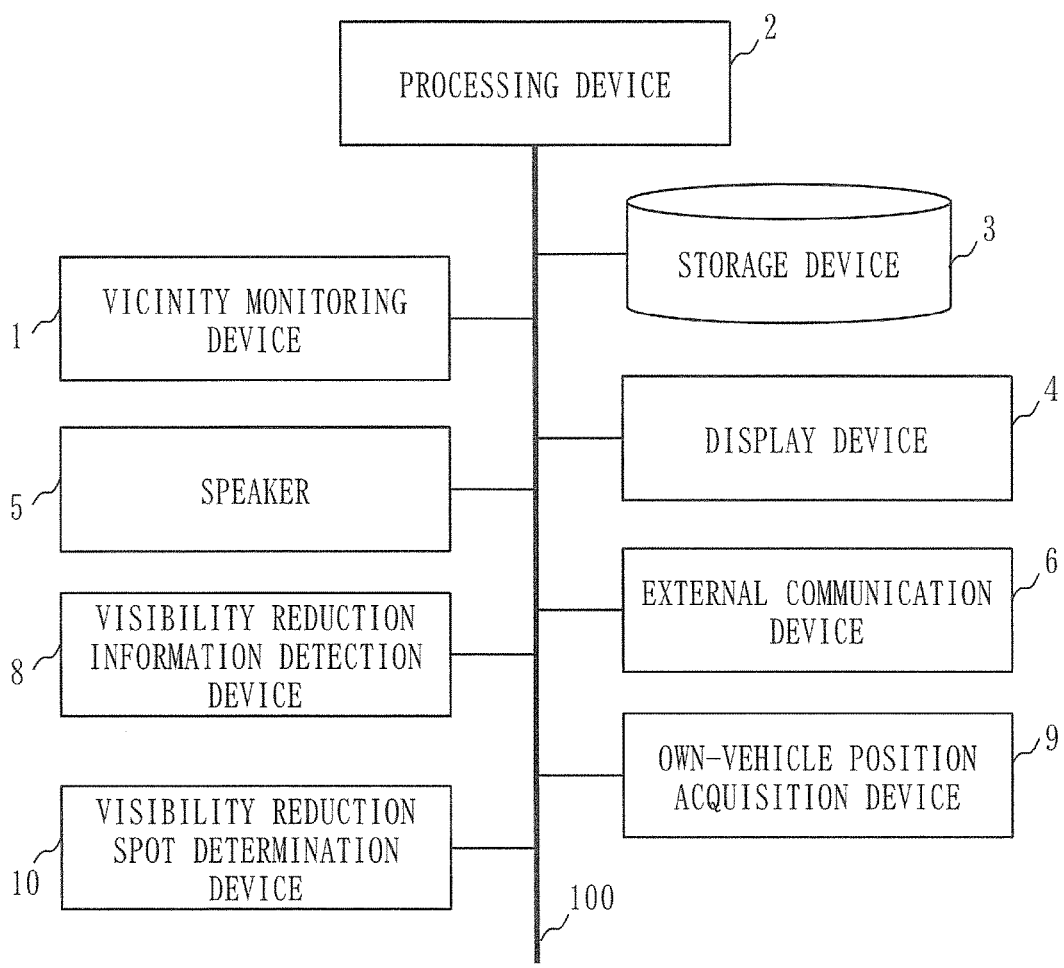
FIG. 1 is a hardware configuration diagram of a driver assistance system according to a first embodiment.
Figure 2:
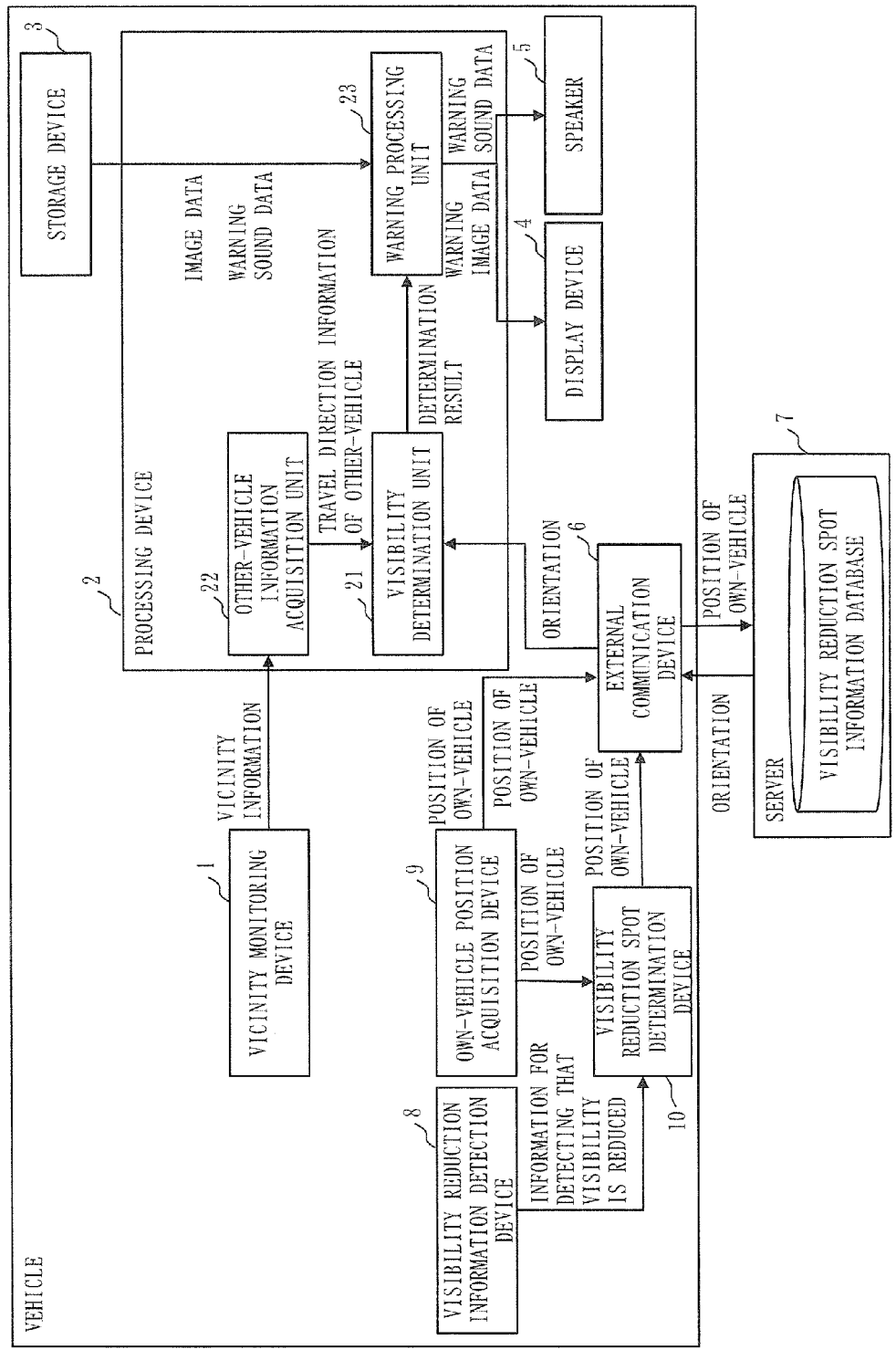
FIG. 2 is a functional block diagram of the driver assistance system according to the first embodiment.

FIG. 1 is a hardware configuration diagram of the driver assistance system according to the first embodiment. FIG. 2 is a functional block diagram of the driver assistance system according to the first embodiment. With reference to FIG. 1, the driver assistance system according to the first embodiment has a vicinity monitoring device 1, a processing device 2, a storage device 3, a display device 4, a speaker 5, an external communication device 6, a server 7, a visibility reduction information detection device 8, an own-vehicle position acquisition device 9, and a visibility reduction spot determination device 10. The processing device 2 is connected with the vicinity monitoring device 1, the storage device 3, the display device 4, the speaker 5, the external communication device 6, the visibility reduction information detection device 8, the own-vehicle position acquisition device 9, and the visibility reduction spot determination device 10 via a CPU bus 100, and can exchange information therewith via the CPU bus 100. Each component will be described below with reference to FIG. 2. The term "own-vehicle" refers to a vehicle that has the driver assistance system and warns that the visibility of a driver is reduced. In the following description, the driver assistance system mounted on this own-vehicle will be described. The term "other-vehicle" refers to a vehicle other than the own-vehicle described above. Further, the term "vehicle" refers to the own-vehicle or the other-vehicle.

The vicinity monitoring device 1 is a device that acquires vicinity information for calculating the position of the other-vehicle and the travel direction of the other-vehicle. For example, a radar, a lidar, a camera, and the like correspond to the vicinity monitoring device 1. The vicinity information refers to information on the distance between the own-vehicle and the other-vehicle acquired by the vicinity monitoring device being, for example, a radar or a lidar, image data imaged by a camera, and the like. In the following description, information on the position of the own-vehicle will be expressed as the position information of the own-vehicle, and information on the position of the other-vehicle will be expressed as the position information of the other-vehicle. Information on the travel direction of the own-vehicle will be expressed as the travel direction information of the own-vehicle, and information on the travel direction of the other-vehicle will be expressed as the travel direction information of the other-vehicle.

The processing device 2 is a device to determine whether or not the visibility of a driver in the other-vehicle is reduced. For example, a CPU (Central Processing Unit) corresponds to the processing device 2. Reduction in the visibility refers to a state in which the driver of the other-vehicle finds it difficult to see his or her surroundings when dazzled by sunlight or dazzled by sunlight reflecting off a building, a car, or the like. The processing device 2 has a visibility determination unit 21, an other-vehicle information acquisition unit 22, and a warning processing unit 23. The processing device 2 implements the functions of the other-vehicle information acquisition unit 22, the visibility determination unit 21, and the warning processing unit 23 to be described later by executing a program pre-stored in the storage device 3 or the like. The driver assistance system may be the processing device 2, or may have the processing device 2 and the server 7 to be described later.

The storage device 3 stores image data for warning to be displayed by the display device 4 to be described later and sound data for warning to be output by the speaker 5 to be described later when the processing device 2 determines that the visibility of the driver in the other-vehicle is reduced. In the following description, the image data for warning and the sound data for warning will be expressed as warning data.

The display device 4 displays an image for warning when the processing device 2 determines that the visibility of the driver in the other-vehicle is reduced. For example, a head-up display, an instrument panel, and a display for displaying road information of a car navigation system correspond to the display device 4. In this embodiment, it is described that the display device 4 is a head-up display, an instrumental panel, or a display for displaying road information of a car navigation system. However, the display device 4 is not limited to this, and may be a display of a device such as a smart phone or a tablet which is connected externally.

The speaker 5 outputs a sound for warning when the processing device 2 determines that the visibility of the driver in the other-vehicle is reduced. For example, a speaker or speakers attached to the front or the right and left sides in the vehicle to output music or road information of a car navigation system correspond to the speaker 5. Alternatively, the speaker 5 may be a speaker of a device such as a smart phone or a tablet externally connected to an on-board device such as a car navigation system.

The external communication device 6 communicates with an external device. For example, when the server 7 to be described later is an external server installed outside the vehicle, the external communication device 6 transmits and receives information to and from the server 7.

Figures 3, 4:
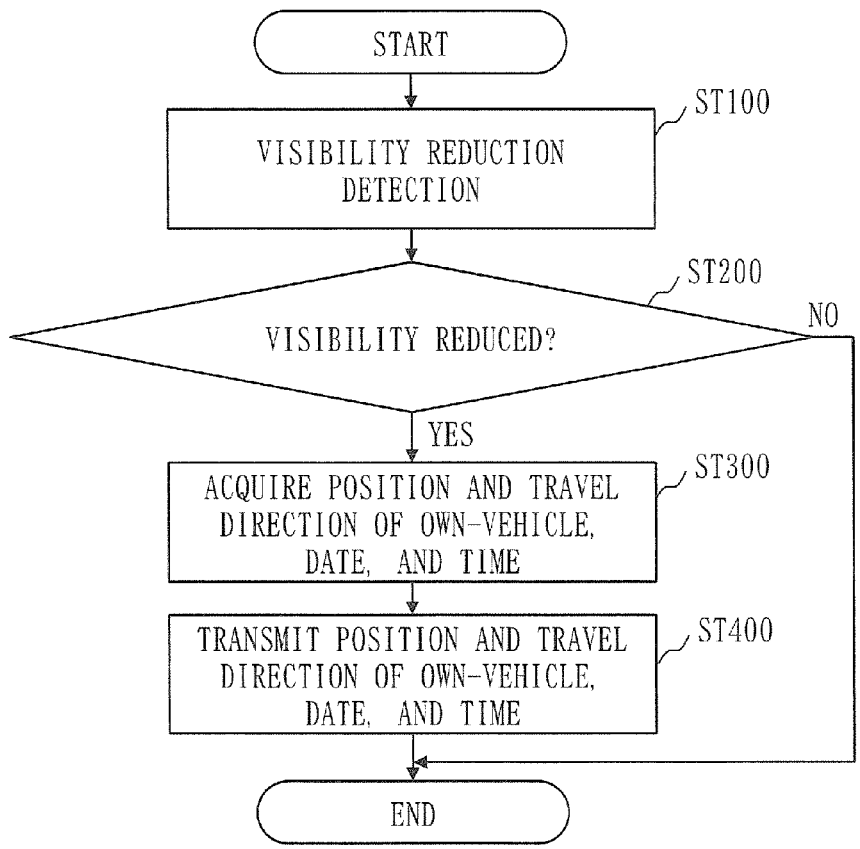
FIG. 3 is an example of a database stored in a server according to the first embodiment.
FIG. 4 is a flowchart of the driver assistance system according to the first embodiment for storing travel direction information of an own-vehicle.

The server 7 has a visibility reduction spot information database. FIG. 3 is an example of the visibility reduction spot information database stored in the server according to the first embodiment. As illustrated in FIG. 3, the visibility reduction spot information database is information in which a date, a time period, a visibility reduction spot, a visibility reduction direction, a degree of glare, and the like are associated with one another. The visibility reduction spot refers to a spot where while the vehicle is traveling, the driver of this vehicle is exposed to sunlight or light reflecting off a building or the like, causing the visibility of the driver to be reduced. In this embodiment, the visibility reduction spot stored in the server 7 will be expressed as coordinates, and the visibility reduction direction will be expressed as an orientation. The orientation corresponds to the direction of sunlight or the direction of light which is sunlight reflecting off a building or the like, or corresponds to the travel direction when the visibility of the driver in the vehicle is reduced, as seen from the vehicle. The data described in the first row of FIG. 3 indicates that on January 1 during the time period 7:00 to 8:00, the visibility of the driver in the vehicle facing in the direction at the orientation 120° or 240° at the spot represented by the coordinates 34.40N, 132.47E is reduced by glare. The degree of glare indicates information on the intensity of glare, and as the intensity of light to which the driver is exposed increases, the degree of glare increases. Note that the server 7 may be an external server provided outside the vehicle, or may be a storage device (not illustrated) inside the vehicle. One that includes an external server outside the vehicle and a storage device in the vehicle may be expressed as a storage unit. In the description of the visibility reduction spot information database, it has been described that a date, a time period, coordinates and a degree of glare are associated with one other. In the following description, however, it is sufficient that at least coordinates and an orientation are associated with each other in the visibility reduction spot information database.

The visibility reduction information detection device 8 is a device that acquires information for detecting that the visibility of the driver in the own-vehicle is reduced, and has an on-board camera or the like, for example. When the visibility reduction information detection device 8 is an on-board camera, the information for detecting that the visibility is reduced corresponds to image data of the face of the driver imaged by the on-board camera.

The own-vehicle position acquisition device 9 is a device that acquires the position information of the own-vehicle and the travel direction information of the own-vehicle. For example, the own-vehicle position acquisition device 9 acquires the position information of the own-vehicle a plurality of times at intervals using a GPS (Global Positioning System) or the like, and calculates the travel direction information of the own-vehicle from the position information of the own-vehicle that changes with time. The position information of the own-vehicle is, for example, information on the latitude and longitude where the own-vehicle is located, and the like. Note that the own-vehicle position acquisition device 9 may acquire the travel direction information of the own-vehicle from data of a CAN (Controller Area Network) (for example, information from a gyroscope sensor, a magnetic field sensor, or the like).

The visibility reduction spot determination device 10 determines whether or not the visibility of the driver in the own-vehicle is reduced. When it is determined that the visibility of the driver in the own-vehicle is reduced, the visibility reduction spot determination device 10 transmits the position information of the own-vehicle and the travel direction information of the own-vehicle to the server 7.

The configuration of the processing device 2 will now be described in detail with reference to FIG. 2.

The other-vehicle information acquisition unit 22 acquires the vicinity information from the vicinity monitoring device 1, and calculates the travel direction of the other-vehicle on the basis of this vicinity information. Note that a method for calculating the travel direction of the other-vehicle will be described later.

The visibility determination unit 21 determines whether or not the visibility of the driver in the other-vehicle is reduced on the basis of the travel direction information of the other-vehicle calculated by the other-vehicle information acquisition unit 22 and orientation information acquired from the server 7.

When the visibility determination unit 21 determines that the visibility of the driver in the other-vehicle is reduced, the warning processing unit 23 acquires at least one of the image data for warning and the sound data for warning from the storage device 3, and outputs it to the display device 4 or the speaker 5.

Note that the functions of the other-vehicle information acquisition unit 22, the visibility determination unit 21, and the warning processing unit 23 described above may be implemented by the processing device 2, or may be implemented in the server 7.

Processing by the driver assistance system according to the first embodiment to store the travel direction information of the own-vehicle in the visibility reduction spot information database will be described below with reference to FIG. 4. FIG. 4 is a flowchart of the operation of the driver assistance system according to the first embodiment for storing the travel direction information of the own-vehicle.

In ST100, the visibility reduction spot determination device 10 acquires the information for detecting that the visibility is reduced from the visibility reduction information detection device 8.

Figure 5:
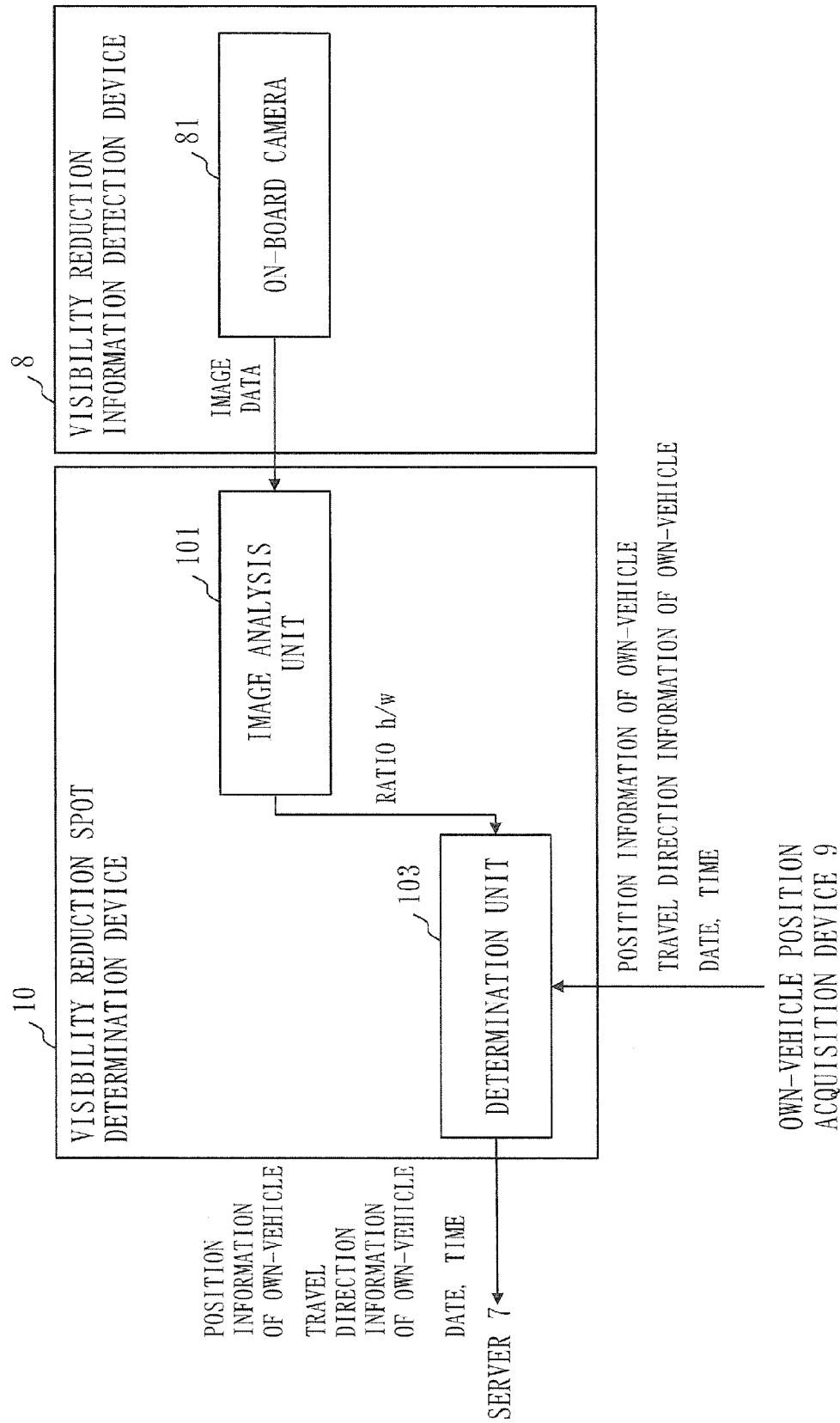
FIG. 5 is a functional block diagram of a visibility reduction information detection device and a visibility reduction spot determination device according to the first embodiment.
Figure 6:
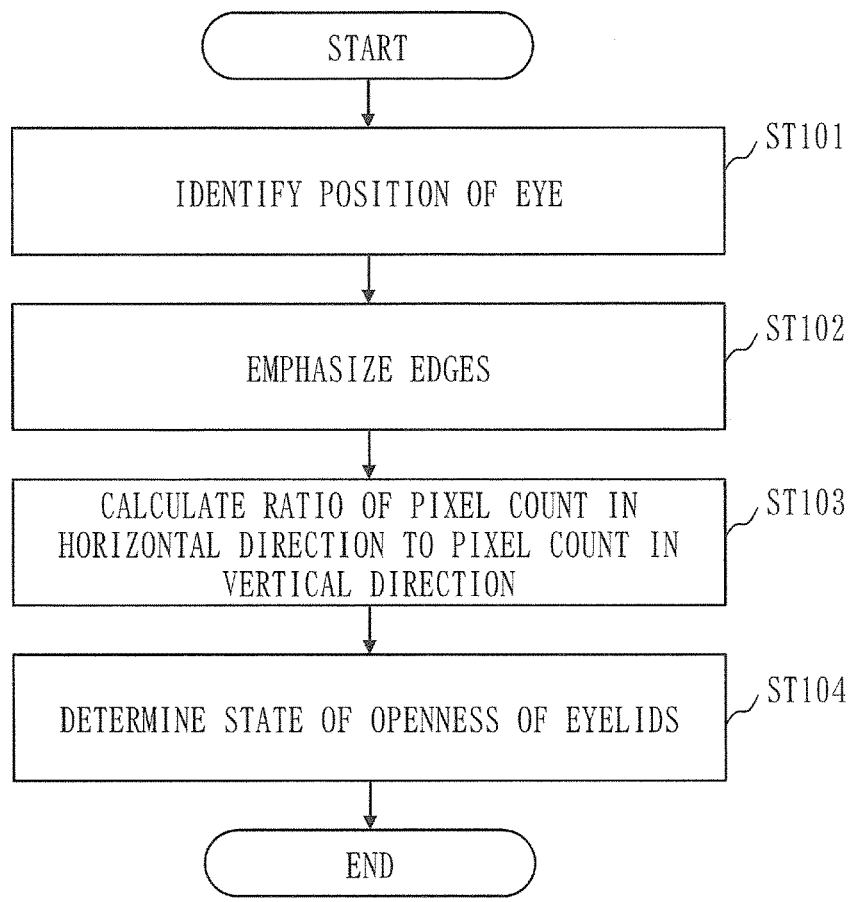
FIG. 6 is a flowchart of the operation of the visibility reduction spot determination device according to the first embodiment.
Figure 7:
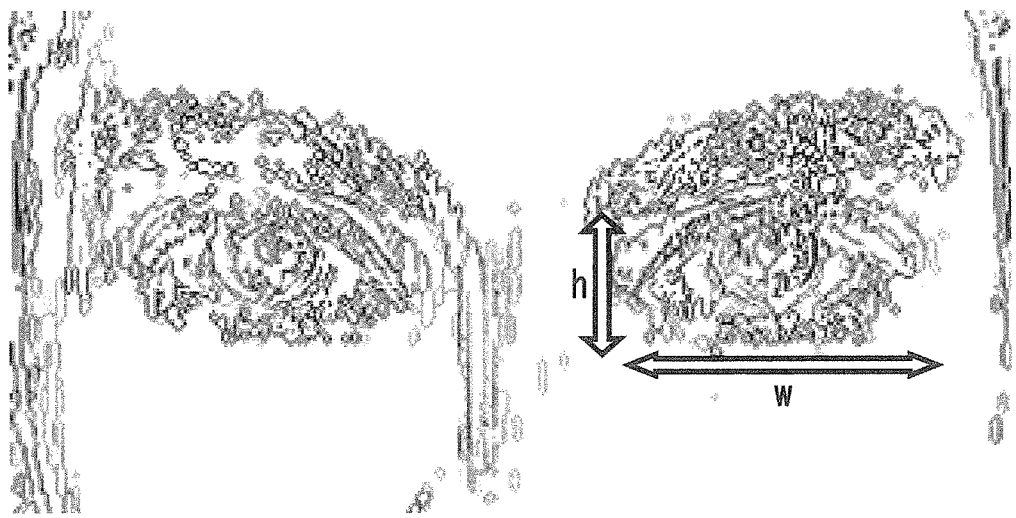
FIG. 7 is an example of an image in which edges of eyelids are emphasized by filtering processing by an image analysis unit according to the first embodiment.

In ST200, the visibility reduction spot determination device 10 determines whether or not the visibility of the driver in the own-vehicle is reduced on the basis of the information for detecting that the visibility is reduced. A method for determining whether or not the visibility of the driver in the own-vehicle is reduced will be described in detail below with reference to FIG. 5 to FIG. 7. FIG. 5 is a functional block diagram of the visibility reduction spot determination device 10 and the visibility reduction information detection device 8 according to the first embodiment. FIG. 6 is a flowchart of the operation of the visibility reduction spot determination device 10 according to the first embodiment. FIG. 7 is an example of an image in which edges of eyelids are emphasized by filtering processing by an image analysis unit according to the first embodiment.

With reference to FIG. 5, the visibility reduction information detection device 8 has an on-board camera 81. The on-board camera 81 is a device that images the face of the driver. The visibility reduction spot determination device 10 has an image analysis unit 101 and a determination unit 103. The image analysis unit 101 is a device that analyzes image data imaged by the on-board camera 81 and calculates information on the degree of openness of eyelids to be described later. The determination unit 103 is a device that determines whether or not the visibility of the driver in the own-vehicle is reduced on the basis of the information on the degree of openness of eyelids calculated by the image analysis unit 101.

With reference to FIG. 6, the on-board camera 81 images the face of the driver, and outputs image data of the face to the image analysis unit 101 of the visibility reduction spot determination device 10. The image analysis unit 101 analyzes the image data and identifies the position of an eye (ST101).

The image analysis unit 101 applies filter processing on the image data using a Sobel filter, and emphasizes edges of eyelids (ST102).

The image analysis unit 101 extracts a maximum value h in a vertical direction and a maximum value w in a horizontal direction from the pixel counts of the emphasized edges, as illustrated in FIG. 7. The image analysis unit 101 calculates a ratio h/w of the maximum value h in the vertical direction to the maximum value w in the horizontal direction (ST103). The ratio h/w corresponds to the information on the degree of openness of eyelids.

The image analysis unit 101 outputs information on the ratio h/w to the determination unit 103. The determination unit 103 determines the degree of openness of eyelids on the basis of the information on the ratio h/w acquired from the image analysis unit 101 (ST104). For example, the determination unit 103 is provided with a threshold in advance. If the ratio h/w is more than or equal to the threshold, the determination unit 103 determines that the visibility of the driver in the own-vehicle is reduced. If the ratio h/w is less than or equal to the threshold, the determination unit 103 determines that the visibility of the driver in the own-vehicle is not reduced. If it is determined that the visibility is reduced, the visibility reduction spot determination device 10 executes processing of ST300 in FIG. 4. On the other hand, if it is determined that the visibility is not reduced, the visibility reduction spot determination device 10 ends the processing.

In ST300, if it has been determined that the visibility of the driver in the own-vehicle is reduced, the visibility reduction spot determination device 10 acquires the position information of the own-vehicle and the travel direction information of the own-vehicle from the own-vehicle position acquisition device 9, and acquires the date and time at which it is determined that the visibility is reduced from time keeping means (not illustrated).

In ST400, the visibility reduction spot determination device 10 transmits information on the position of the own-vehicle, the travel direction of the own-vehicle, the date, and the time to the server 7 via the external communication device 6. The server 7 stores the position information of the own-vehicle, the travel direction information of the own-vehicle, the information on the date, and the information on the time in the visibility reduction spot information database.

For example, in the example in FIG. 3, if the visibility reduction spot determination device 10 determines that the visibility of the driver in the own-vehicle is reduced when the own-vehicle faces in the direction at the orientation (corresponding to the travel direction of the own-vehicle) of 240° at the spot represented by the coordinates (corresponding to the position of the own-vehicle) of 34.40N, 132.47E during the time period 7:30 on January 1, the visibility reduction spot determination device 10 stores the date "1/1", the time period "7:00 to 8:00", the coordinates "34.40N, 132.47E", and the orientation "240°" in the server 7. The visibility reduction spot determination device 10 also stores a degree of glare corresponding to the degree of openness of eyelids, for example "30%", in the server 7. The visibility reduction spot determination device 10 does not necessarily need to transmit information on the date and time to the server 7. For example, the server 7 may have time keeping means (not illustrated) to keep the current date and time, and may store information on coordinates, an orientation, and a degree of glare acquired from the visibility reduction spot determination device 10 in association with the date and time period at the point in time at which these pieces of information are acquired.

In FIG. 4, an example in which the driver assistance system is provided in the own-vehicle is described. The driver assistance system may also be provided in the other-vehicle. If the driver assistance system is provided in the other-vehicle, the driver assistance system of the other-vehicle outputs the position information of the other-vehicle and the travel direction information of the other-vehicle to the server 7 when it is determined that the visibility is reduced. By thus also storing the position information of the other-vehicle and the travel direction information of the other-vehicle in the visibility reduction spot information database, the amount of information in the visibility reduction spot information database can be increased. Note that the position information of the own-vehicle or the position information of the other-vehicle output from the driver assistance system of the own-vehicle or the other-vehicle will be expressed as the position information of the vehicle, and the travel direction information of the own-vehicle or the travel direction information of the other-vehicle transmitted from the driver assistance system of the own-vehicle or the other-vehicle will be expressed as the travel direction information of the vehicle.

It is assumed that the visibility reduction spot information database according to this embodiment automatically stores the position information of the vehicle and the travel direction information of the vehicle when the visibility of the driver in the own-vehicle or the other-vehicle is reduced. However, the position information of the vehicle and the travel direction information of the vehicle may be pre-stored in the visibility reduction spot information database manually by the designer.

Figure 8:
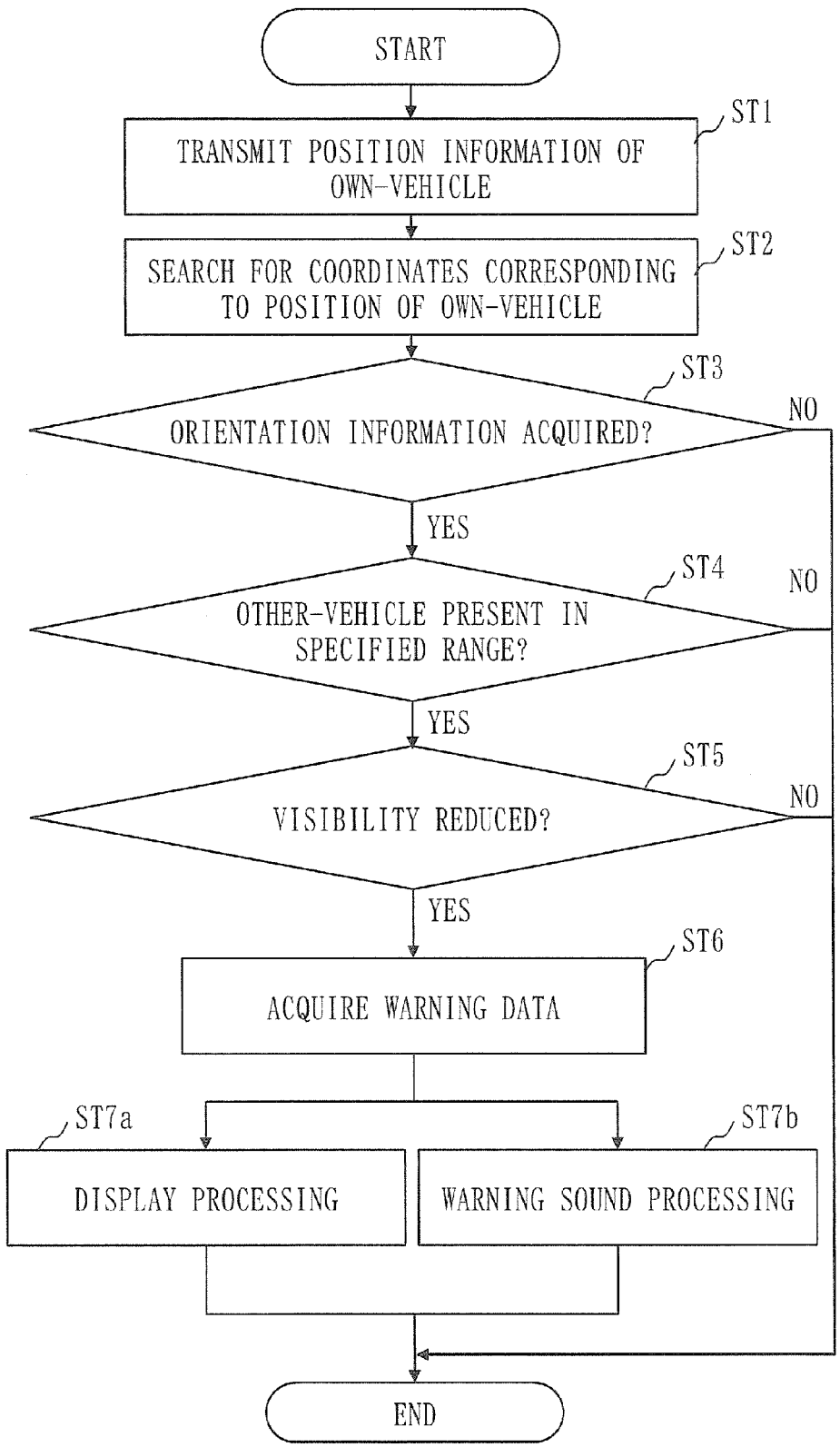
FIG. 8 is a flowchart of the operation of the driver assistance system according to the first embodiment for processing to warn that the visibility of a driver in an other-vehicle is reduced.

The operation of warning processing of the driver assistance system according to the first embodiment will now be described with reference to FIG. 8. FIG. 8 is a flowchart of the operation of the processing of the driver assistance system according to the first embodiment for warning that the visibility of the driver in the other-vehicle is reduced.

In ST1, the own-vehicle position acquisition device 9 transmits the position information of the own-vehicle at predetermined time intervals to the server 7 via the external communication device 6. The predetermined time interval is set arbitrarily by the designer of the driver assistance system. In the description of FIG. 8, it is assumed that the own-vehicle position acquisition device 9 transmits information of the position of the own-vehicle "33.40N, 131.47E" to the server 7 at the time "9:30".

In ST2, the server 7 receives the information of the position of the own-vehicle "33.40N, 131.47E" from the own-vehicle position acquisition device 9. The server 7 searches the time periods stored in the visibility reduction spot information database illustrated in FIG. 3 to find a time period that includes the time at which the position information of the own-vehicle is received from the own-vehicle position acquisition device 9. Since the information at the time "9:30" is transmitted from the own-vehicle position acquisition device 9, the server 7 extracts the time period "9:00 to 10:00" as a search result. It is assumed that the server 7 has time keeping means (not illustrated) and can acquire the current time from the time keeping means.

Then, in the visibility reduction spot information database, the server 7 searches the coordinates associated with the time period "9:00 to 10:00" retrieved from the visibility reduction spot information database to find information on coordinates corresponding to the position of the own-vehicle "33.40N, 131.47E" received from the own-vehicle position acquisition device 9. For example, if a range of coordinates is set in the server 7 and the position of the own-vehicle "33.40N, 131.47E" received from the own-vehicle position acquisition device 9 is included in the range specified by using the coordinates stored in the visibility reduction spot information database as a basis, the coordinates corresponding to the position of the own-vehicle "33.40N, 131.47E" received from the own-vehicle position acquisition device 9 is considered to be the information on the corresponding coordinates. In the example in FIG. 8, it is assumed that the server 7 extracts the coordinates "34.40N, 132.47E" in the third row of the visibility reduction spot information database as the range that includes the position of the own-vehicle "33.40N, 131.47E" received from the own-vehicle position acquisition device 9. The server 7 transmits information of the orientations "140°, 220°" associated with the extracted coordinates "34.40N, 132.47E" to the external communication device 6. It has been described with reference to FIG. 5 that the server 7 stores the coordinates in the visibility reduction spot information database as information in terms of points. However, the server 7 may store the coordinates as information in terms of ranges. For example, the server 7 can store them in the form of ranges, such as a range of radius Xm from the center of an intersection, a range from spot A to spot B on a particular road, and the like.

It has been described with reference to FIG. 8 that the server 7 determines whether the position of the own-vehicle "33.40N, 131.47E" received from the own-vehicle position acquisition device 9 is included in a predetermined range. However, the present invention is not limited to this, and the visibility determination unit 21 may make a determination. For example, the own-vehicle position acquisition device 9 may transmit information on a range which is specified by being centered at the position of the own-vehicle "33.40N, 131.47E" to the server 7, and the server 7 searches the visibility reduction spot information database to find and transmit information on the orientation associated with the coordinates included in this specified range. With this configuration, a different range can be set for each vehicle.

In ST3, the visibility determination unit 21 acquires information of orientations "140°, 220°" from the server 7 via the external communication device 6. If the orientation information is acquired, the visibility determination unit 21 executes processing of ST4. On the other hand, if no orientation information is acquired, the visibility determination unit 21 ends the processing.

In ST4, the vicinity monitoring device 1 acquires vicinity information. For example, the vicinity monitoring device 1 acquires information on the distance between the own-vehicle and the other-vehicle using a radar or the like. The other-vehicle information acquisition unit 22 acquires the vicinity information from the vicinity monitoring device 1 and determines whether or not the other-vehicle is present within a predetermined range from the own-vehicle. If the other-vehicle is present within the predetermined range from the own-vehicle, the other-vehicle information acquisition unit 22 calculates the position of the other-vehicle on the basis of the position of the own-vehicle and the information on the distance between the own-vehicle and the other-vehicle. Further, the other-vehicle information acquisition unit 22 calculates the position of the other-vehicle a plurality of times, and calculates the travel direction of the other-vehicle from changes in the position of the other-vehicle calculated the plurality of times. The other-vehicle information acquisition unit 22 outputs the calculated travel direction information of the other-vehicle to the visibility determination unit 21 and executes processing of ST5. On the other hand, if it is determined that the other-vehicle is not present within the predetermined range from the own-vehicle, the other-vehicle information acquisition unit 22 ends the processing. The predetermined range may be a distance-measurable range of a radar or the like, or may be any range defined separately from a distance-measuring range of a radar or the like.

In ST5, the visibility determination unit 21 determines whether or not the visibility of the driver in the other-vehicle is reduced on the basis of the travel direction of the other-vehicle acquired from the other-vehicle information acquisition unit 22 and the information of the orientations "140°, 220°" acquired from the server 7. Specifically, if the travel direction of the other-vehicle corresponds with one of the orientations acquired from the server 7, that is, if the travel direction of the other-vehicle is directed in the direction at the orientation 140° or 220°, the visibility determination unit 21 determines that the visibility of the driver in the other-vehicle is reduced. If the visibility determination unit 21 has determined that the visibility of the driver in the other-vehicle is reduced, the processing device 2 executes processing of ST6. On the other hand, if the visibility determination unit 21 has determined that the visibility of the driver in the other-vehicle is not reduced, the processing device 2 ends the processing. The visibility determination unit 21 may determine whether or not the travel direction of the other-vehicle corresponds with one of the orientations acquired from the server 7, not necessarily depending on whether or not there is a complete match between the travel direction of the other-vehicle and one of the orientations acquired from the server 7. For example, the visibility determination unit 21 may be provided in advance with a threshold for a discrepancy between the travel direction of the other-vehicle and one of the orientations acquired from the server 7, and may determined that the travel direction of the other-vehicle corresponds with one of the directions acquired from the server 7 if the discrepancy between the travel direction of the other-vehicle and one of the orientations acquired from the server 7 is less than or equal to the threshold.

In ST6, if the visibility determination unit 21 has determined that the visibility of the driver in the other-vehicle is reduced, the warning processing unit 23 acquires the image data for warning and the sound data for warning from the storage device 3. The warning processing unit 23 outputs the image data for warning to the display device 4, and outputs the sound data for warning to the speaker 5. In this embodiment, it has been described that the warning processing unit 23 acquires both the image data for warning and the sound data for warning. However, the warning processing unit 23 may acquire only one of these.

Figure 9:
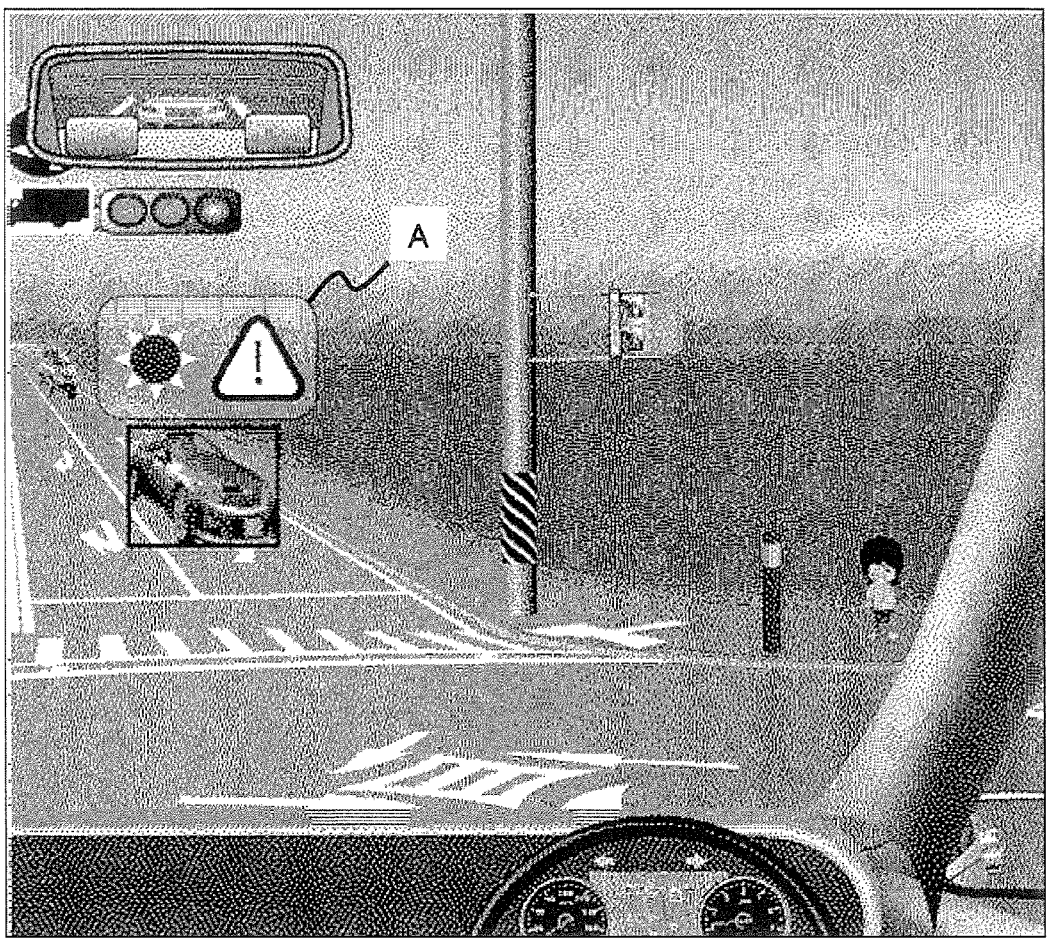
FIG. 9 is an example in which a display device 4 according to the first embodiment displays a warning image.

In ST7a, the display device 4 acquires the image data for warning from the warning processing unit 23, and displays a warning image. FIG. 9 is an example in which the display device 4 according to the first embodiment displays the warning image. In FIG. 9, the warning image is an image denoted by A. With regard to the warning image, for example, the display device 4 displays an image of the other-vehicle and the vicinity of the other-vehicle imaged by a vehicle-exterior camera (not illustrated), and displays a warning over the image of the displayed image of the other-vehicle, as illustrated in FIG. 6. The warning processing unit 23 may acquire the position information of the other-vehicle from the other-vehicle information acquisition unit 22. It has been described that the display device 4 displays the warning image around the image showing the other-vehicle. However, it is not limited to this, and "attention to the vehicle in front" or simply "attention" may be displayed in text form.

In ST7b, the speaker 5 acquires the sound data for warning from the warning processing unit 23, and outputs a warning sound. As the warning sound, a voice sound such as "attention to the vehicle in front" or "attention to the vehicle to the right" may be output, or the warning sound may be a buzzer or the like.

As described above, the driver assistance system according to the first embodiment determines whether or not the visibility of the driver in the other-vehicle is reduced, using the visibility reduction spot information database in which a spot at which the visibility of the driver in the vehicle is reduced and information, associated with this spot, on a direction in which the visibility of the driver in the vehicle is reduced are associated with each other, and on the basis of the travel direction information of the other-vehicle and the information on the direction in which the visibility is reduced stored in the visibility reduction spot information database. Further, if it is determined that the visibility of the driver in the other-vehicle is reduced, the driver assistance system warns the driver of the own-vehicle that the visibility of the driver in the other-vehicle is reduced. Therefore, the driver of the own-vehicle can pay attention to the movement of the other-vehicle while driving.

It has been described that the other-vehicle information acquisition unit 22 according to this embodiment acquires the vicinity information for calculating the position information of the other-vehicle and the travel direction information of the other-vehicle from the vicinity monitoring device 1. However, the other-vehicle information acquisition unit 22 may acquire the position information of the other-vehicle and the travel direction information of the other-vehicle from the other-vehicle via the external communication device 6. That is, the other-vehicle information acquisition unit 22 may acquire the position information of the other-vehicle and the travel direction information of the other-vehicle through vehicle-to-vehicle communication. By thus using vehicle-to-vehicle communication, it is possible to acquire the vicinity information of the other-vehicle which is traveling in a place where the vicinity information cannot be acquired by a radar, a lidar, or the like because of a wall or a fence, for example.

It has been described that the visibility determination unit 21 according to this embodiment acquires the travel direction information of the other-vehicle from the other-vehicle information acquisition unit 22 when determining whether or not the visibility of the driver in the other-vehicle is reduced. The visibility determination unit 21 may further acquire the position information of the other-vehicle. If the position information of the other-vehicle is acquired, the visibility determination unit 21 determines whether or not the other-vehicle is present within a specified range from the position of the own-vehicle. If the other-vehicle is present within this range, the visibility determination unit 21 determines that the visibility of the driver in this other-vehicle is reduced. The specified range may be a range which is the same as a range for searching in the database when the server 7 acquires information on the coordinates of the own-vehicle or a range transmitted by the own-vehicle position acquisition device 9 to the server 7, or may be a range different from these. By thus determining whether or not the other-vehicle is present in the specified range from the position of the own-vehicle, if the position information of the other-vehicle is acquired through vehicle-to-vehicle communication, for example, the other-vehicle that is traveling at a significantly remote position from the position of the own-vehicle can be excluded from warning targets. Therefore, the driver assistance system according to this embodiment does not display a warning in such a case where there is a significantly remote possibility of a collision or the like, so that the reliability of warnings can be enhanced.

The driver assistance system according to this embodiment may determine whether or not this other-vehicle is present within a specified range from the coordinates acquired from the server 7. If the other-vehicle is present within the specified range from the coordinates obtained from the server 7, the driver assistance system determines that the visibility of this other-vehicle is reduced. By thus determining that the visibility is reduced with regard to the other-vehicle that is present within the specified range from the coordinates acquired from the server 7, even if a plurality of pieces of coordinates obtained from the server 7 are present within the specified range from the own-vehicle, it is possible to determine that the visibility of the driver in the other-vehicle that is nearer to the coordinates obtained from the server 7 is reduced and to warn the driver of the own-vehicle.

It has been described that the visibility determination unit 21 according to this embodiment acquires the orientation information from the server 7. However, the visibility determination unit 21 may acquire information on the degree of glare associated with the orientation information in the visibility reduction spot information database, and determine whether or not to provide a warning on the basis of this degree of glare. For example, the visibility determination unit 21 has a threshold for the degree of glare. If the degree of glare acquired from the server 7 is more than or equal to the threshold, the visibility determination unit 21 displays the warning image or outputs the warning sound for the driver of the own-vehicle. The driver assistance system according to this embodiment thus acquires the information on the degree of glare, so that it is possible to determine whether or not to warn the driver of the own-vehicle depending on to what degree the visibility of the driver of the other-vehicle is reduced. Therefore, it is possible to perform control such as, not to provide a warning if the visibility is reduced to a significantly low level.

It has been described that the visibility determination unit 21 according to this embodiment acquires orientations on the basis of the visibility reduction spot information database. However, if orientation data is not recorded (see the row of date 9/3 in FIG. 3), the visibility determination unit 21 may calculate the position of the sun and determine whether or not the visibility of the other-vehicle is reduced on the basis of this position of the sun and the travel direction of the other-vehicle. In this way, in the driver assistance system according to this embodiment, if orientation information is not recorded in the visibility reduction spot information database, the visibility determination unit 21 calculates the direction of the sun and determines whether or not the visibility of the other-vehicle is reduced. Therefore, it is possible to warn the driver of the own-vehicle that the visibility of the driver in the other-vehicle is reduced even at a spot at which orientation data is not available.

In the description of the visibility reduction spot determination device 10 according to this embodiment, the example in which pieces of information on coordinates, an orientation and a degree of glare are stored in association with one another in the server 7 has been described. The visibility reduction spot determination device 10 may determine whether or not to store information on coordinates and an orientation in the visibility reduction spot information database on the basis of the information on the degree of glare. For example, the visibility reduction spot determination device 10 has a threshold for the degree of glare. If the information on the degree of glare acquired from the visibility reduction information detection device 8 is more than or equal to the threshold, the visibility reduction spot determination device 10 transmits the information on the coordinates, the orientation, and the degree of glare to the server 7. On the other hand, if the degree of glare acquired from the visibility reduction information detection device 8 is less than or equal to the threshold, the visibility reduction spot determination device 10 does not transmit the information on the coordinates, the orientation, and the degree of glare to the server 7. The driver assistance system thus determines whether or not to store the information on the coordinates, the orientation, and the degree of glare depending on the degree of glare, so that in such a case where the visibility is reduced to a small degree, it is possible to not store the information on the coordinates, the orientation and the degree of glare. Therefore, the accuracy of the visibility reduction spot information database can be enhanced.

It has been described that the visibility reduction spot determination device 10 according to this embodiment determines whether or not the visibility of the driver in the own-vehicle is reduced on the basis of the degree of openness of eyelids. However, it is not limited to this, and the visibility reduction spot determination device 10 may determine whether or not the visibility of the driver in the own-vehicle is reduced on the basis of a line of sight of the driver or the state of a sun visor provided in the vehicle.

Figure 10:
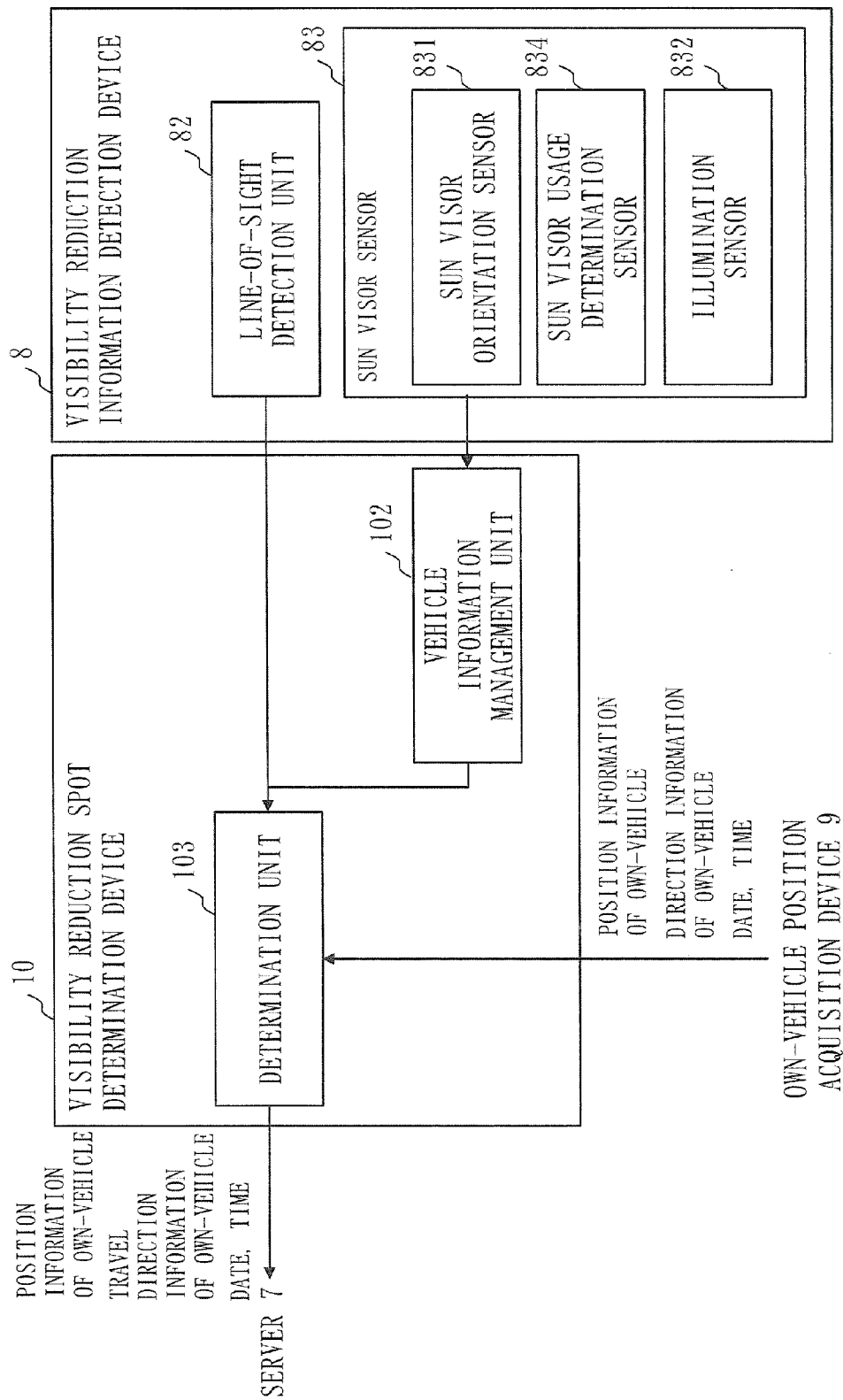
FIG. 10 is a functional block diagram of a visibility reduction information detection device and a visibility reduction spot determination device when reduction in the visibility is determined on the basis of a line of sight of a driver or the state of a sun visor.

FIG. 10 is a functional block diagram of the visibility reduction information detection device 8 and the visibility reduction spot determination device 10 in a case in which reduction in the visibility is determined on the basis of the line of sight or the state of the sun visor. With reference to FIG. 10, a line-of-sight detection unit 82 is a device that detects a line of sight of the driver. The line-of-sight detection unit 82 acquires information on whether or not a line of sight has been detected or on a distribution of lines of sight, and outputs the information to the determination unit 103. The determination unit 103 acquires the information on whether or not the line of sight of the driver has been detected or on the distribution of lines of sight, and determines whether or not the visibility of the driver in the own-vehicle is reduced. For example, in the detection of a line of sight, it is possible to detect a line of sight by exposing the face of the driver in the own-vehicle to infrared light and measuring corneal reflex. However, when light such as the westering sun enters the eyes of the driver, this light reflects off the eyes of the driver, so that it may not be possible to detect a line of sight properly. The determination unit 103 uses this property that a line of sight cannot be detected when external light enters the eyes of the driver, so as to detect that the visibility of the driver in the own-vehicle is reduced under the influence of external light.

Figure 11:
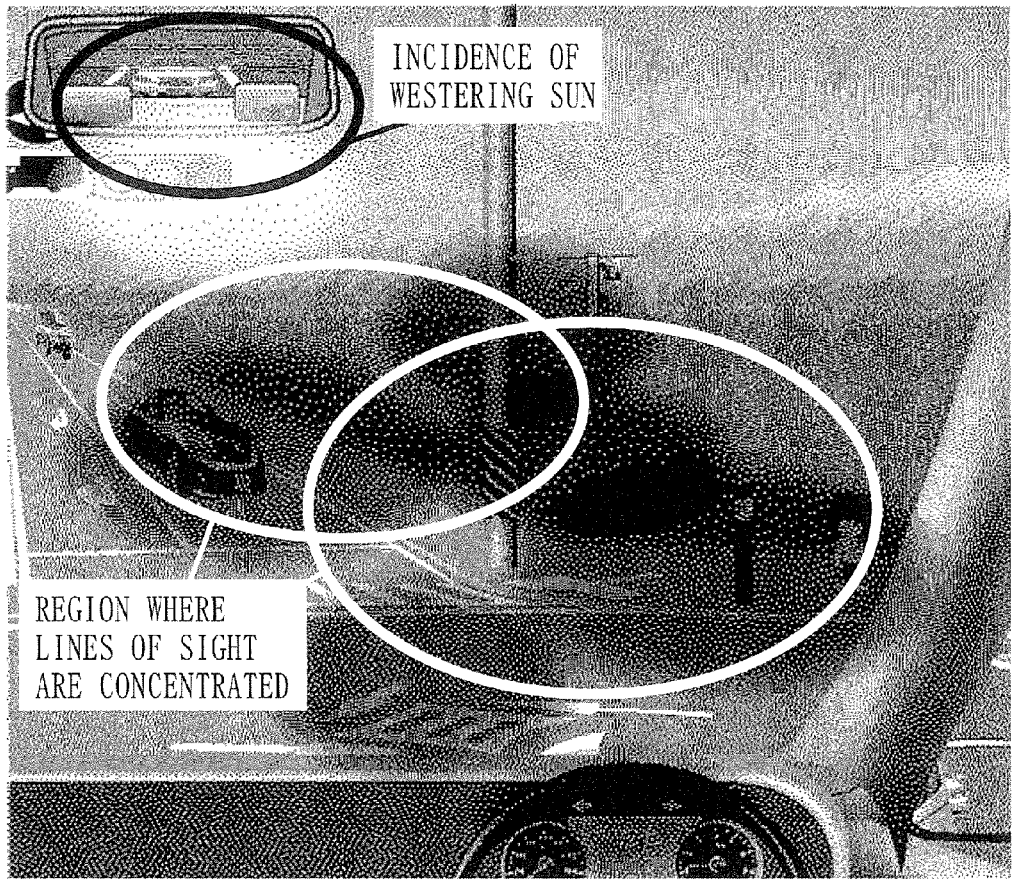
FIG. 11 is a diagram illustrating a distribution of lines of sight of a driver of an own-vehicle.

When lines of sight of the driver in the own-vehicle can be detected, the line-of-sight detection unit 82 may detect that the visibility is reduced depending on whether or not the lines of sight avoid a particular region to which attention should be paid. FIG. 11 is a diagram illustrating a distribution of lines of sight of the driver of the own-vehicle according to the first embodiment. With reference to FIG. 11, upon experiencing glare under the influence of external light, the driver of the own-vehicle avoids looking at the vicinity of the center of this external light. Although the traffic lights in front are an object to which the driver should pay attention, the driver avoids directing the line of sight thereto because of entrance of the external light. By thus extracting a tendency to avoid directing the line of sight to a particular region of attention by the line-of-sight detection function, it is deduced whether the driver is experiencing glare.

Figure 12:
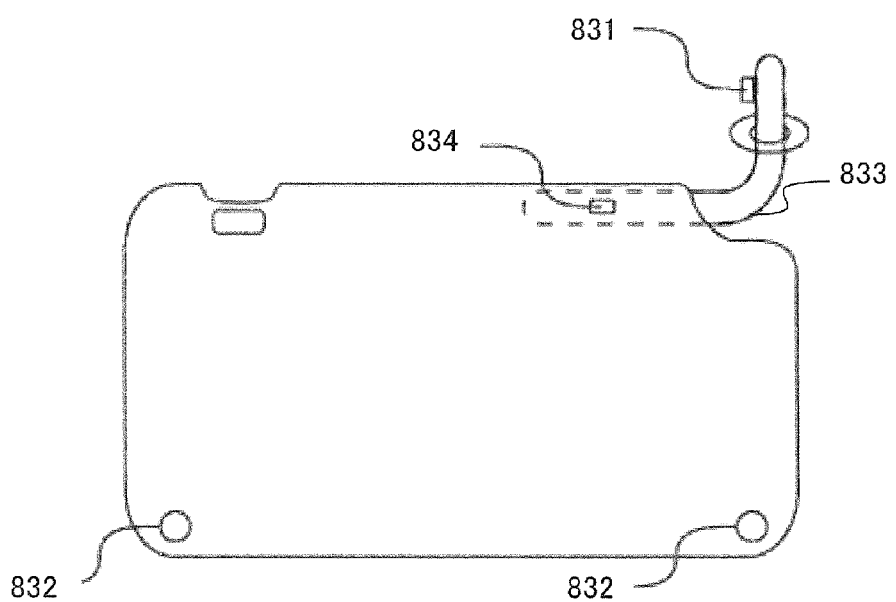
FIG. 12 is a diagram describing a sun visor sensor according to the first embodiment.

The visibility reduction spot determination device 10 may determine whether or not the visibility of the driver in the own-vehicle is reduced on the basis of a sun visor sensor 83 provided in the vehicle. FIG. 12 is a diagram describing the sun visor sensor according to the first embodiment. The sun visor sensor 83 has a sun visor orientation sensor 831, a sun visor use determination sensor 834, and an illumination sensor 832.

With reference to FIG. 12, the sun visor use determination sensor 834 is provided at a hinge portion 833 extending inside the sun visor. The sun visor use determination sensor 834 rotates in accordance with rotation of the hinge portion 833 when the sun visor is used. That is, the sun visor use determination sensor 834 detects use of the sun visor by detecting rotation of the hinge shaft in a horizontal shaft direction. The sun visor use determination sensor 834 corresponds, for example, to a contact switch or a non-contact magnetic sensor.

The sun visor orientation sensor 831 is provided in the proximity of a part of the hinge portion to be connected to a roof part of the vehicle. The sun visor orientation sensor detects rotation of the hinge shaft in a vertical shaft direction. The sun visor orientation sensor 831 detects in which direction the sun visor faces by detecting rotation of the hinge shaft 831 in the vertical shaft direction. The sun visor orientation sensor 831 corresponds, for example, to a rotary encoder.

The illumination sensor 832 is provided at a lower portion of a surface, of the two surfaces of the sun visor, which faces the outside of the vehicle, and detects the intensity of light entering the driver's seat.

A vehicle information management unit 102 can detect the driver's intention to use the sun visor and the entrance direction and intensity of external light on the basis of information detected by the sun visor orientation sensor 831, the sun visor use determination sensor 834, and the illumination sensor 832, and deduces whether or not the visibility of the driver in the own-vehicle is reduced. The vehicle information management unit 102 outputs information on whether or not the visibility is reduced to the determination unit 103. The determination unit 103 determines whether or not the visibility is reduced on the basis of the information from the vehicle information management unit 102 or the line-of-sight detection unit 82, and transmits the position information of the own-vehicle and the travel direction information of the own-vehicle to the server 7 if it is determined that the visibility is reduced.

Second Embodiment

Figure 13:
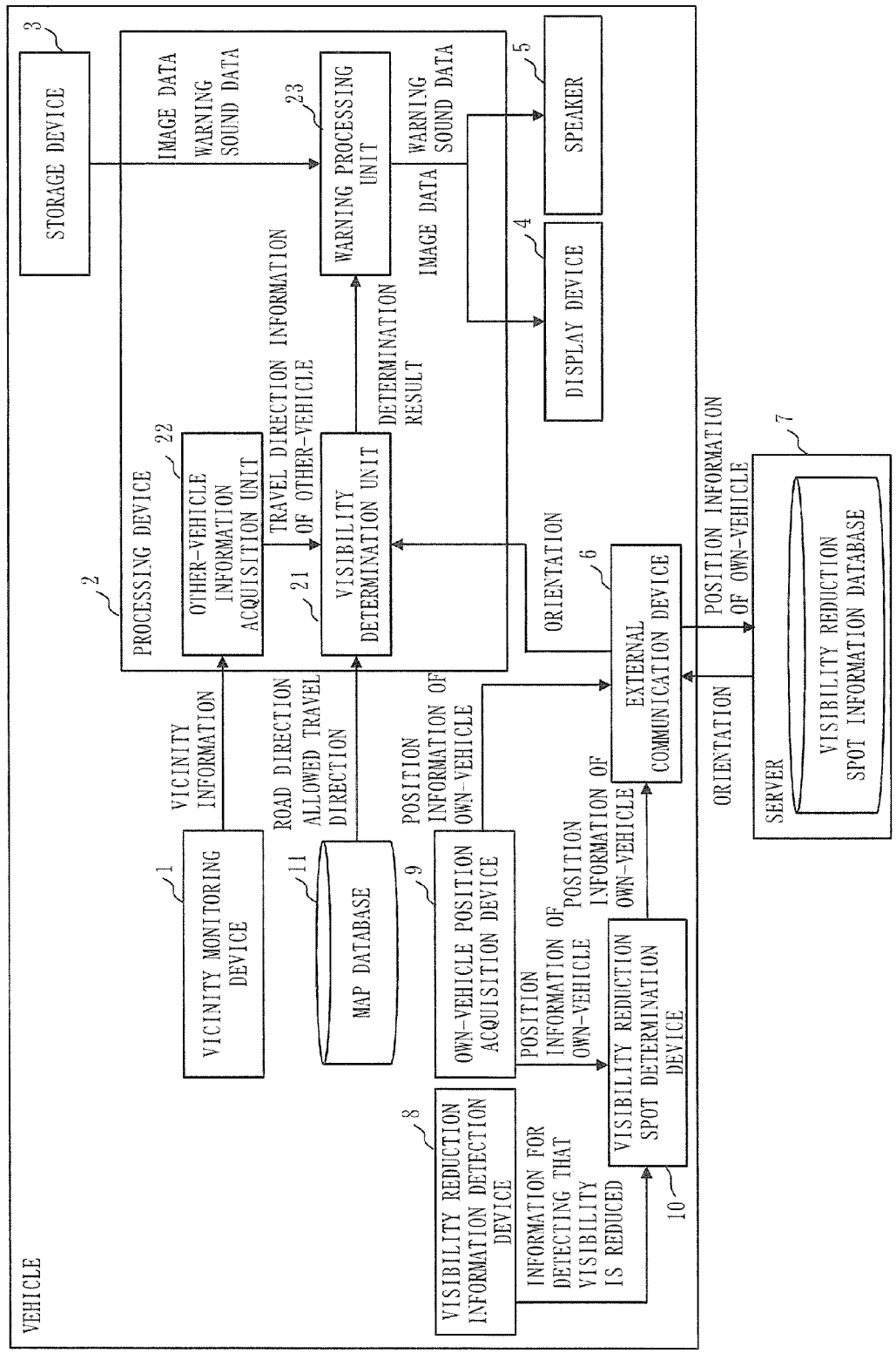
FIG. 13 is a functional block diagram of a driver assistance system according to a second embodiment.

A driver assistance system according to a second embodiment is characterized in that the driver assistance system warns the driver of the own-vehicle about a direction in which the visibility of the driver in the other-vehicle is reduced regardless of whether or not the other-vehicle is actually traveling, on the basis of information on orientations in a visibility reduction spot information database and road information in map data. The configuration of the driver assistance system according to the second embodiment will be described below with reference to FIG. 13. FIG. 13 is a functional block diagram of the driver assistance system according to the second embodiment. In the description of FIG. 13, those corresponding to the components of the driver assistance system according to the first embodiment will be given the same reference numerals, and description thereof will be omitted.

The driver assistance system according to the second embodiment has a map database 11. The map database 11 stores information on roads on which vehicles travel (hereinafter referred to as road information). In an example in FIG. 13, the map database 11 is provided in the vehicle. However, the map database 11 may be provided in an external server.

In the driver assistance system according to this embodiment, a visibility determination unit 21 acquires the position information of the own-vehicle from an own-vehicle position acquisition device 9. The visibility determination unit 21 acquires the road information in the map database 11 on the basis of the position information of the own-vehicle, and determines a road on which there is a possibility that the visibility of the driver in the other-vehicle may be reduced, on the basis of this road information and orientation information acquired from a server 7. The road information refers to information on roads on which vehicles can travel. For example, it is assumed that the road information includes at least road directions and information on directions in which the vehicles are allowed to travel on the roads (hereinafter referred to as allowed travel direction information). The road on which there is a possibility that the visibility of the driver may be reduced refers to a road on which when the other-vehicle travels thereon, there is a risk that the visibility of the driver in this other-vehicle may be reduced.

An example of the map database 11 will be described here with reference to FIG. 14. FIG. 14 is an example of the map database according to the second embodiment. The map database 11 is composed of a position of the own-vehicle, road directions, and allowed travel directions. The road directions indicate directions in which the roads extend as seen at the coordinates represented by the position of the own-vehicle. The allowed travel directions indicate directions in which the vehicles are allowed to travel on the roads. For example, the position of the own-vehicle "34.40N, 132.47E" in FIG. 14 indicates a case in which the own-vehicle is at an intersection and roads extend in directions of 30°, 120°, 210°, and 300°. The roads extending in the directions of 30°, 120°, 210°, and 300° are each associated with allowed travel directions, which are 0 (traveling allowed in both directions), 0 (traveling allowed in both directions), −1 (traveling allowed in a direction to the center of the intersection), and 1 (traveling allowed in a direction away from the center of the intersection), respectively. The visibility determination unit 21 acquires the road directions and the allowed travel directions on the basis on the position of the own-vehicle.

Figure 15:
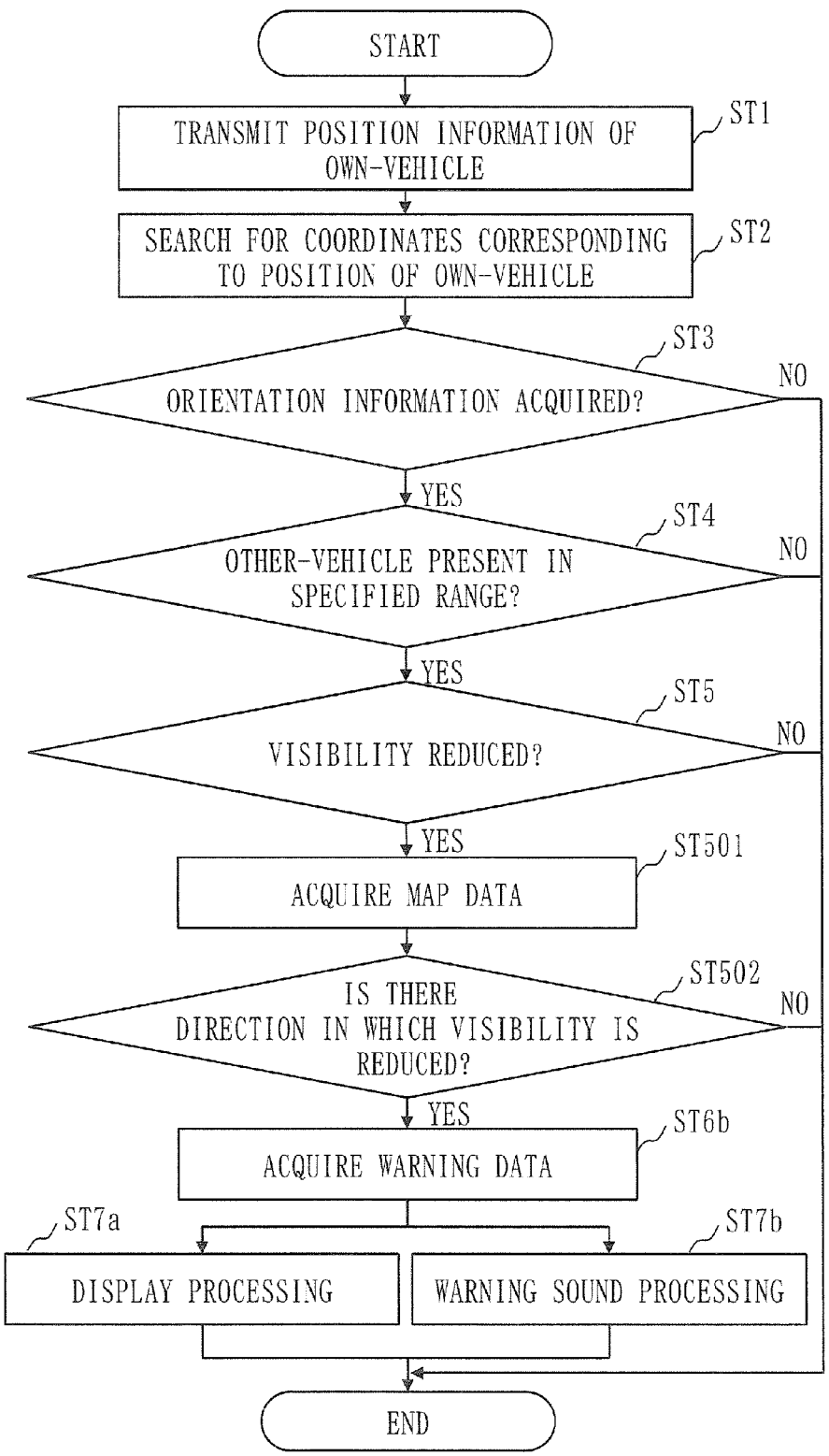
FIG. 15 is a flowchart of the operation of the driver assistance system according to the second embodiment.

The operation of the driver assistance system according to the second embodiment will now be described with reference to FIG. 15. FIG. 15 is a flowchart of the operation of the driver assistance system according to the second embodiment. In the description of FIG. 15, those corresponding to the operational steps of the driver assistance system according to the first embodiment will be given the same reference numerals, and description thereof will be omitted. In the description of ST1 to ST5 in FIG. 15, it is assumed that in the driver assistance system, the own-vehicle determines at the intersection that the visibility of the other-vehicle in front is reduced, as described with reference to FIG. 8, and ST501 and subsequent steps will be described.

In ST501, the visibility determination unit 21 acquires the position information of the own-vehicle from the own-vehicle position acquisition device 9. The visibility determination unit 21 acquires the road information regarding the vicinity of the position of the own-vehicle from the map database 11, on the basis of the position information of the own-vehicle.

In ST502, the visibility determination unit 21 determines a road on which there is a possibility that the visibility of a driver is reduced (hereinafter referred to as a direction in which the visibility is reduced), on the basis of this road information and the orientation information acquired from the visibility reduction spot information database. For example, when the own-vehicle is at the intersection as illustrated in FIG. 9, the visibility determination unit 21 acquires the road information about this intersection. From the road information about the intersection, the visibility determination unit 21 recognizes that there is a possibility that a vehicle may advance from a rightward road, a leftward road, and a road in front as seen from the position of the own-vehicle. Further, from the orientations in the visibility reduction spot information database, the visibility determination unit 21 determines which one of the roads from which there is a possibility that a vehicle may advance is the road on which the visibility of the driver in this other-vehicle traveling thereon is reduced. Specifically, the visibility determination unit 21 determines whether one of the road directions in the map database coincides with one of the orientations in the visibility reduction spot information database. If one of the road directions in the map database coincides with one of the orientations in the visibility reduction spot information database, the visibility determination unit 21 determines whether or not this orientation in the visibility reduction spot information database coincides with the allowed travel direction. If the orientation in the visibility reduction spot information database coincides with the allowed travel direction, the visibility determination unit 21 outputs to the warning processing unit 23 information on the road on which there is a possibility that the visibility of the driver in the other-vehicle is reduced, as information on the direction in which the visibility is reduced. In the example in FIG. 9, it is assumed that when the own-vehicle is at the intersection, the rightward direction as seen from the own-vehicle is the direction in which the visibility of the driver is reduced.

In ST6b, on the basis of the information on the road on which there is a possibility that the visibility of the driver is reduced which is acquired from the visibility determination unit 21, the warning processing unit 23 acquires corresponding image data or sound data for warning from the storage device 3, and outputs it to the display device 4 or the speaker 5.

Figure 16:
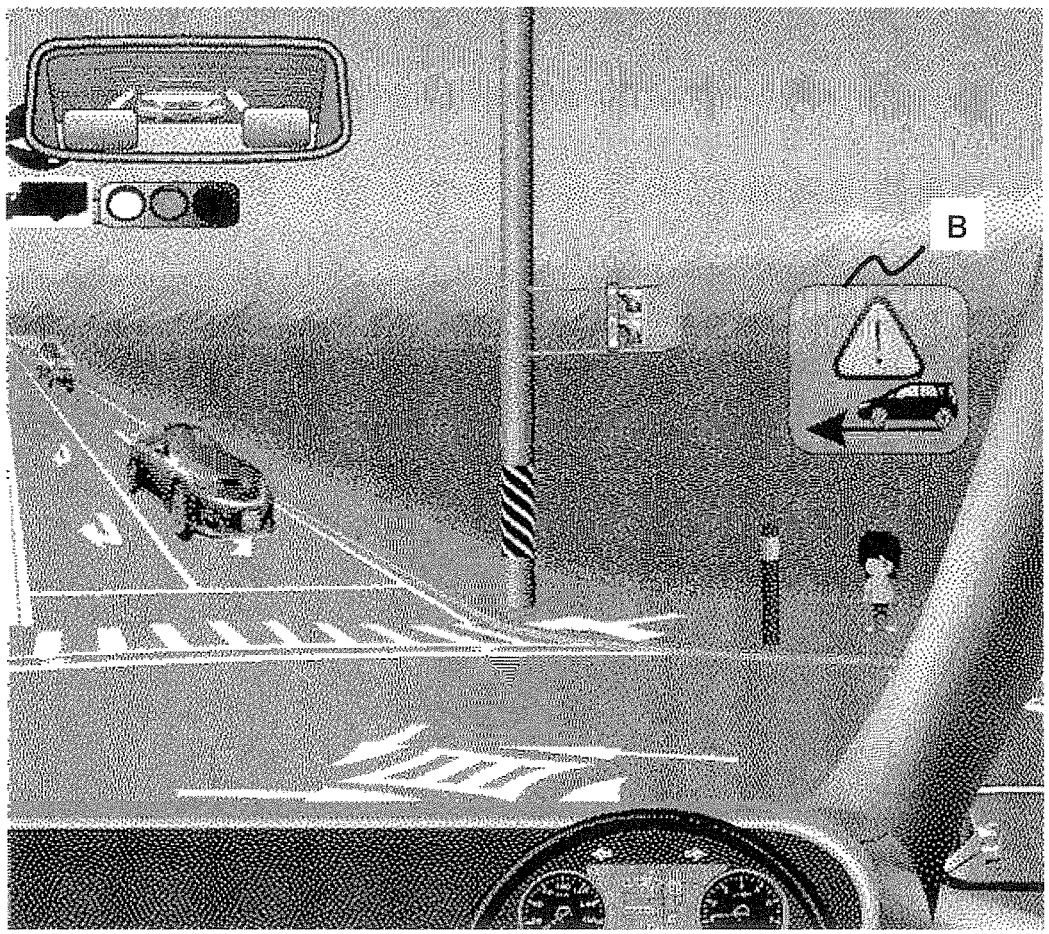
FIG. 16 is an example in which a display device according to the second embodiment displays a warning image.

In ST7a, the display device 4 acquires the image data for warning and displays this image. FIG. 16 is an example in which the display device 4 according to the second embodiment displays the warning image. In FIG. 16, B denotes the warning image in this embodiment. The warning image B indicates that if the other-vehicle advances from the rightward direction as seen from the own-vehicle, there is a risk that the visibility of this other-vehicle may be reduced.

In ST6b, the speaker 5 acquires the sound data for warning and outputs this sound.

As described above, the driver assistance system according to the second embodiment determines a direction in which the visibility of the driver in the other-vehicle is reduced on the basis of the information on roads on which vehicles are allowed to travel and the travel direction information of the vehicle, and warns the driver of the own-vehicle about the direction in which the visibility is reduced. Therefore, even in a case where the presence of the other-vehicle cannot be detected, the direction in which the visibility is reduced can be predicted in advance and the driver can pay attention thereto while driving.

It has been described with reference to FIG. 8 that if it is determined in ST5 that the visibility is reduced, the processing to acquire the map data in ST501 is performed. However, it is not limited to this, and ST501 may be executed even if it is determined in ST5 that the visibility is not reduced.

Third Embodiment

Figure 17:
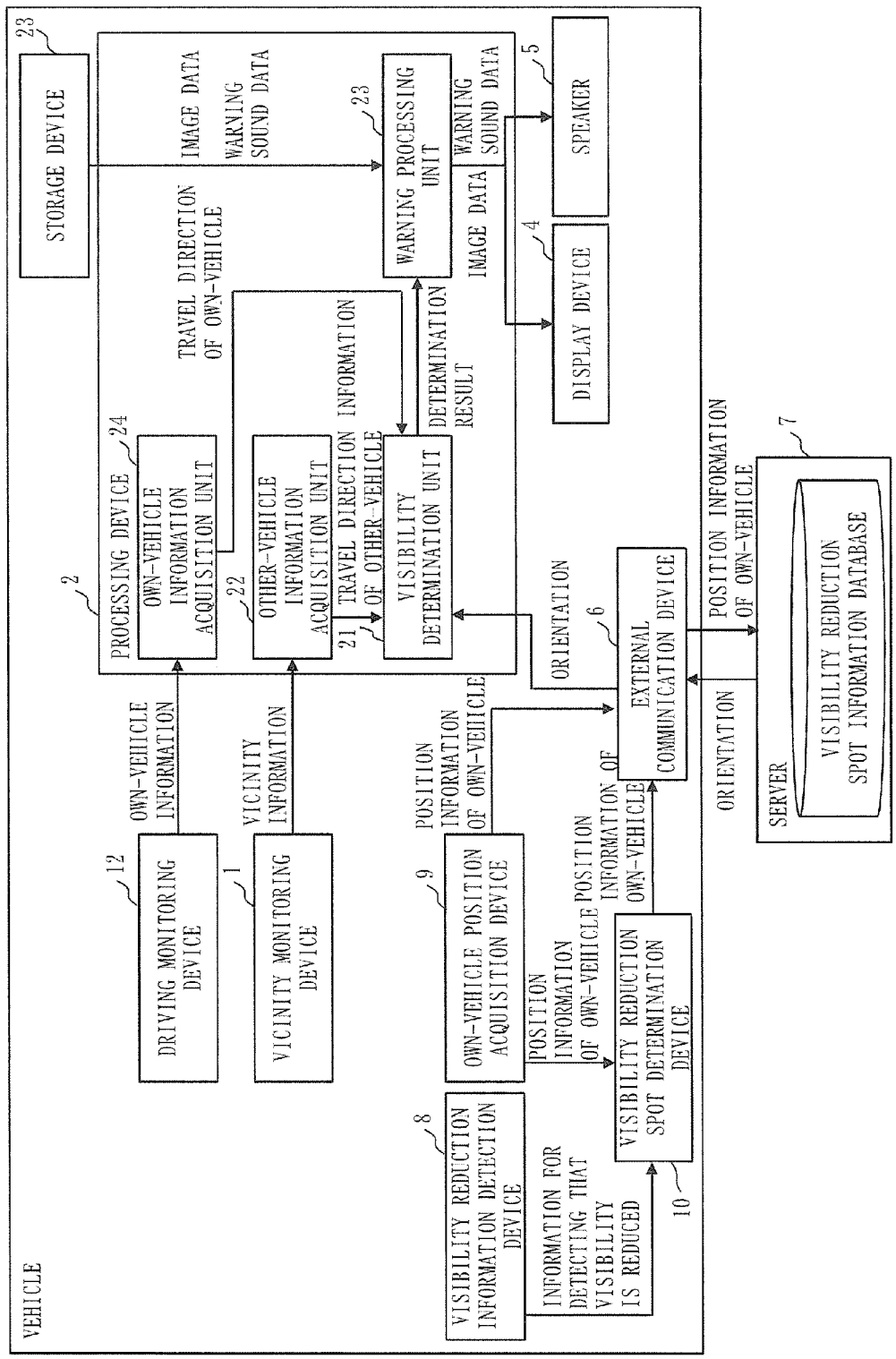
FIG. 17 is a functional block diagram of a driver assistance system according to a third embodiment.

A driver assistance system according to a third embodiment is characterized in that when there is a strong possibility that the own-vehicle and the other-vehicle may collide on the basis of the travel direction information of the own-vehicle and the travel direction information of the other-vehicle, the driver assistance system warns that the visibility of the driver in the other-vehicle is reduced. The configuration of the driver assistance system according to the third embodiment will be described below with reference to FIG. 17. FIG. 17 is a functional block diagram of the driver assistance system according to the third embodiment. In the description of FIG. 17, those corresponding to the components of the driver assistance systems according to the first embodiment and the second embodiment will be given the same reference numerals, and description thereof will be omitted.

The driver assistance system according to the third embodiment has a driving monitoring device 12 and an own-vehicle information acquisition unit 24.

The driving monitoring device 12 is a device that monitors own-vehicle information, such as brakes, an accelerator, turn signals, and a travel direction of the own-vehicle, using a vehicle information acquisition system such as a CAN.

The own-vehicle information acquisition unit 24 is a device that acquires the own-vehicle information from the driving monitoring device 12, and determines therefrom a direction in which the own-vehicle is going to advance.

In this embodiment, it is assumed that an other-vehicle information acquisition unit 22 acquires vicinity information from a vicinity monitoring device 1, and estimates therefrom a direction in which the other-vehicle is going to advance.

A visibility determination unit 21 determines whether or not the visibility of the driver in the other-vehicle is reduced, and acquires the travel direction information of the other-vehicle from the other-vehicle information acquisition unit 22 and acquires the travel direction information of the own-vehicle from the own-vehicle information acquisition unit 24 to determine whether or not there is a strong possibility that the own-vehicle and the other-vehicle may collide.

Figure 18:
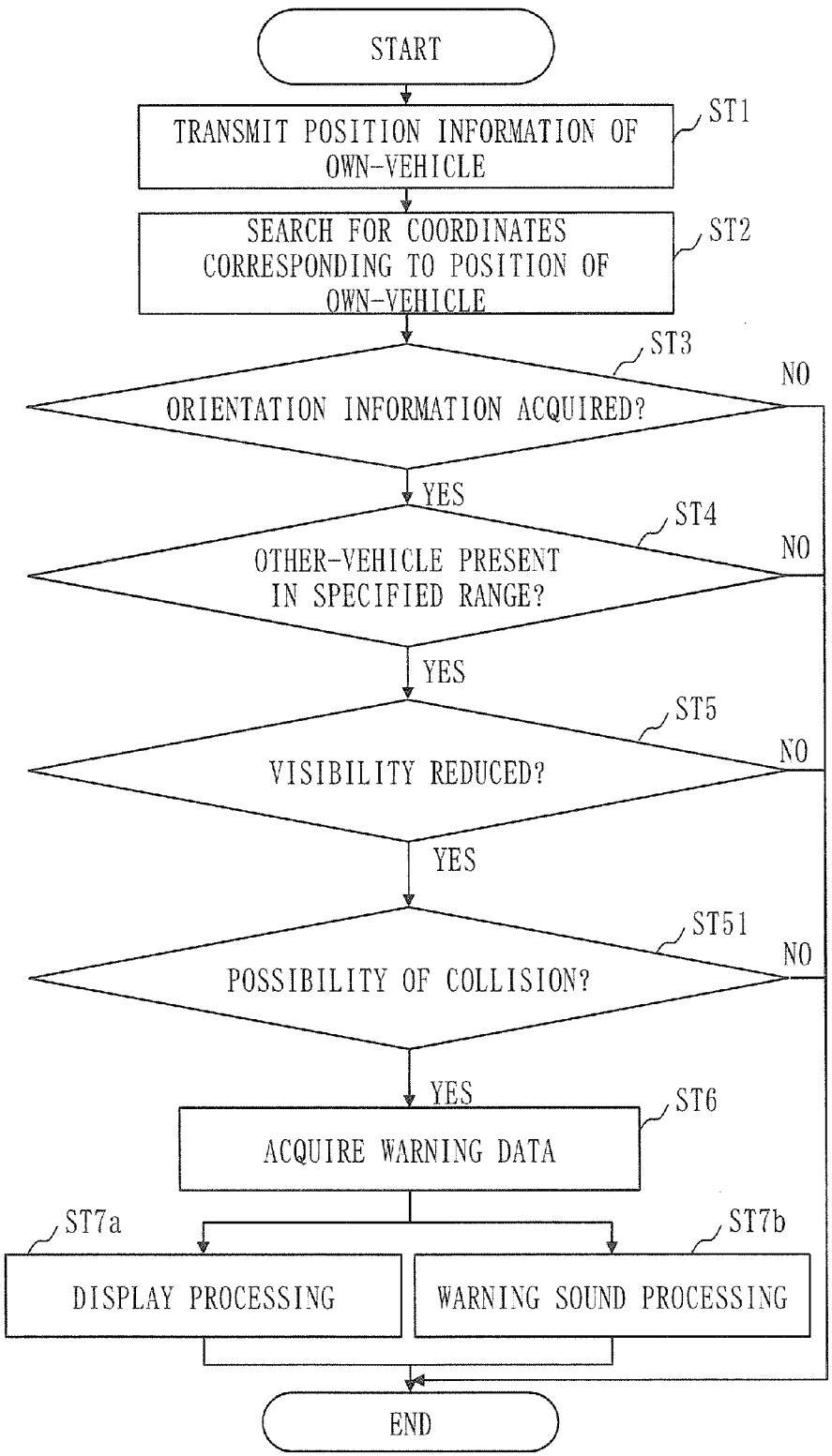
FIG. 18 is a flowchart of the operation of the driver assistance system according to the third embodiment.

The operation of the driver assistance system according to the third embodiment will now be described with reference to FIG. 18. FIG. 18 is a flowchart of the operation of the driver assistance system according to the third embodiment. In the description of FIG. 18, those corresponding to the operational steps of the driver assistance systems according to the first embodiment and the second embodiment will be given the same reference numerals, and description thereof will be omitted. In the description of FIG. 18, it is assumed that in ST1 to ST5, the own-vehicle determines at the intersection that the visibility of the other-vehicle in front is reduced, as described with reference to FIG. 8, and ST51 and subsequent steps will be described.

In ST51, the driving monitoring device 12 acquires the own-vehicle information. The driving monitoring device 12 outputs this own-vehicle information to the visibility determination unit 21. The visibility determination unit 21 acquires the own-vehicle information, and predicts a direction in which the own-vehicle is going to advance. For example, when the own-vehicle is at rest at the intersection, the visibility determination unit 21 can easily predict the direction in which the own-vehicle is going to advance from the direction of the turn signals or the like. Further, the visibility determination unit 21 determines whether or not there is a possibility that the own-vehicle and the other-vehicle may collide on the basis of the travel direction of the own-vehicle and the travel direction of the other-vehicle. For example, when the own-vehicle is at rest at the intersection and the other-vehicle is at rest in the opposing lane, if the other-vehicle is next going to advance straight ahead and the own-vehicle is going to make a right turn, there is a strong possibility that the own-vehicle and the other-vehicle may collide. If the visibility determination unit 21 thus determines that there is a strong possibility that the own-vehicle and the other-vehicle may collide, the visibility determination unit 21 notifies a warning processing unit 23 that the visibility of the driver in the other-vehicle is reduced, which has been determined in ST5, and then proceeds to ST6. On the other hand, for example, if the other-vehicle is going to advance straight ahead and the own-vehicle is going to make a left turn, there is a remote possibility that the own-vehicle and the other-vehicle may collide. Thus, the visibility determination unit 21 ends the processing without notifying the warning processing unit 23 that the visibility of the driver in the other-vehicle is reduced, which has been determined in ST5. Whether or not there is a strong possibility that the own-vehicle and the other-vehicle may collide if the own-vehicle and the other-vehicle advance in which directions can be designed arbitrarily by the designer of the driver assistance system.

As described above, the driver assistance system according to the third embodiment determines a possibility of a collision between the own-vehicle and the other-vehicle on the basis of the travel direction information of the own-vehicle and the travel direction information of the other-vehicle, and warns that the visibility of the driver in the other-vehicle is reduced if it is determined that there is a possibility of a collision. Therefore, it is possible to prevent providing a warning each time the visibility of the other-vehicle is reduced and to warn the driver of the own-vehicle only when necessary.

In this embodiment, the other-vehicle information acquisition unit 22 determines in which direction the other-vehicle advances on the basis of the vicinity information acquired from the vicinity monitoring device 1. However, the other-vehicle information acquisition unit 22 may acquire information on the direction in which the other-vehicle travels from the external communication device 6 through vehicle-to-vehicle communication, and estimate the direction in which the other-vehicle is going to advance on the basis of the vicinity information and the information acquired from the external communication device 6.

Figure 19:
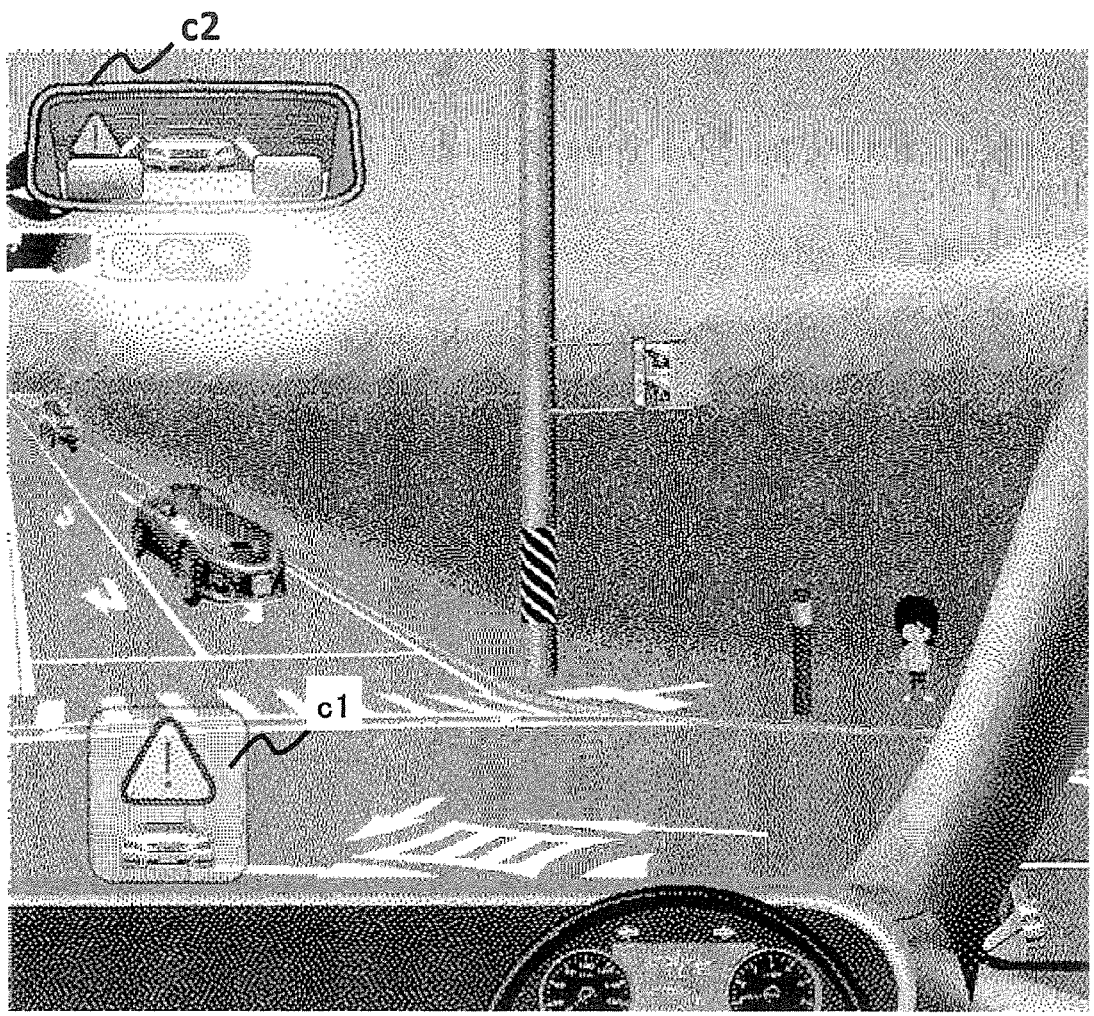
FIG. 19 is an example in which a display device according to the third embodiment displays a warning image.

The visibility determination unit 21 according to this embodiment, which determines a possibility of a collision on the basis of the travel direction of the own-vehicle and the travel direction of the other-vehicle, may further determine a possibility that the other-vehicle behind may collide with the own-vehicle on the basis of information on the speed of the own-vehicle and the speed of the other-vehicle. In a case in which a possibility of a collision is determined on the basis of the information on the speed of the own-vehicle and the speed of the other-vehicle, the driving monitoring device 12 outputs the information on the speed of the own-vehicle (hereinafter referred to as speed information of the own-vehicle) to the visibility determination unit 21 via the own-vehicle information acquisition unit 24. The vicinity monitoring device 1 also outputs information on the speed of the other-vehicle (hereinafter referred to as speed information of the other-vehicle) in addition to the vicinity information to the visibility determination unit 21 via the other-vehicle information acquisition unit 22. The visibility determination unit 21 determines whether or not the other-vehicle behind will collide with the own-vehicle on the basis of a relative speed of the speed of the own-vehicle and the speed of the other-vehicle behind. If it is determined that there is a possibility that the vehicle behind may collide with the own-vehicle, the visibility determination unit 21 outputs information indicating that the visibility of the vehicle behind is reduced to the warning processing unit 23. FIG. 19 is an example in which the display device 4 according to the third embodiment displays a warning image. With reference to FIG. 19, if the visibility determination unit 21 determines that there is a strong possibility that the own-vehicle and the other-vehicle behind may collide, for example, the display device 4 displays a warning image C1. A warning image C2 may also be displayed on a rearview mirror or the like. By determining a possibility of a collision on the basis of the information on the speed of the own-vehicle and the speed of the other-vehicle, the visibility determination unit 21 can determine that the visibility of the driver in the other-vehicle traveling behind the own-vehicle is reduced and there is a strong possibility that the other-vehicle behind may collide with the own-vehicle.

Fourth Embodiment

Figure 20:
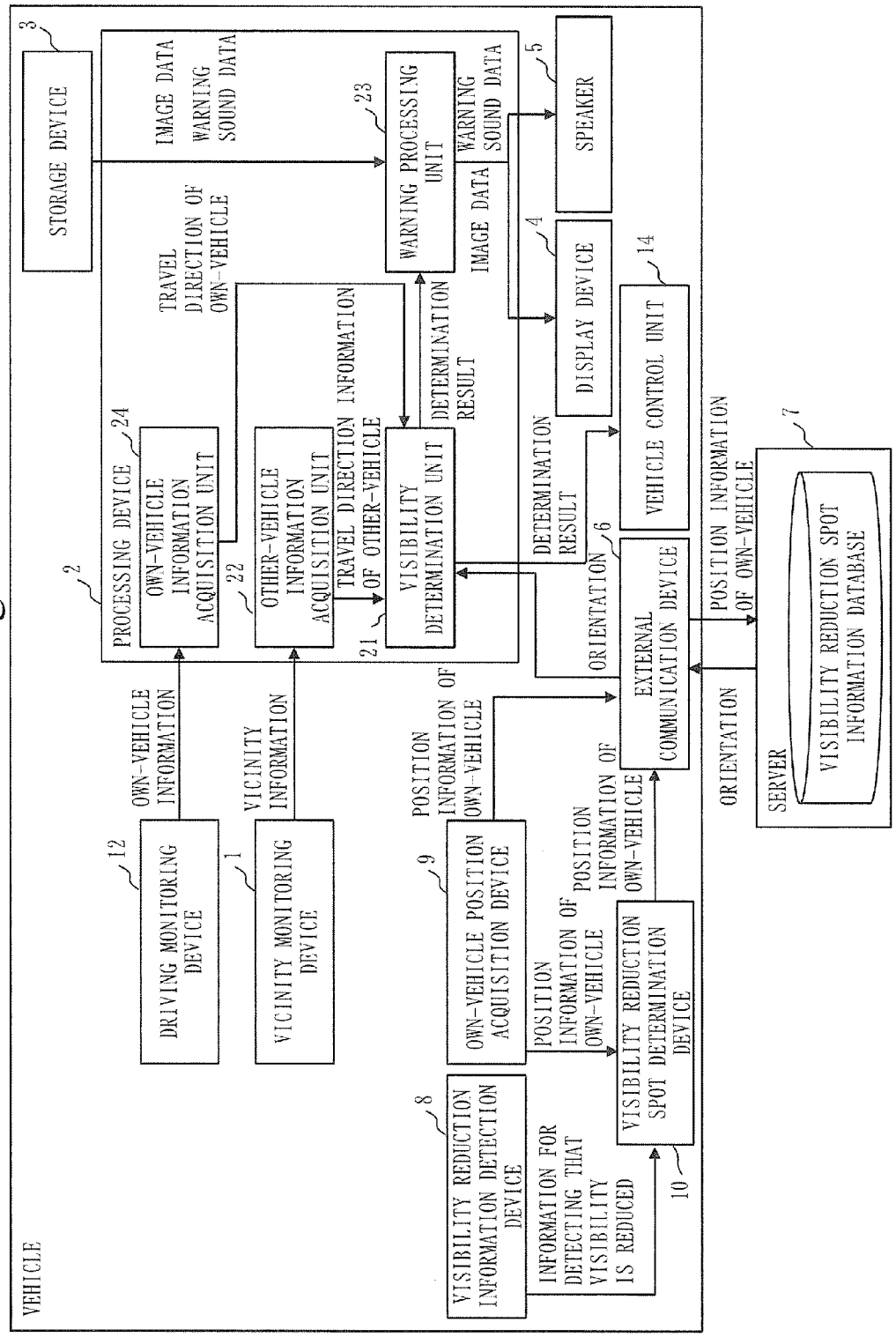
FIG. 20 is a functional block diagram of a driver assistance system according to a fourth embodiment.

A driver assistance system according to a fourth embodiment is characterized in that when there is a strong possibility that the own-vehicle and the other-vehicle may collide on the basis of the travel direction of the own-vehicle and the travel direction information of the other-vehicle, the driver assistance system controls the vehicle. The configuration of the driver assistance system according to the fourth embodiment will be described below with reference to FIG. 20. FIG. 20 is a functional block diagram of the driver assistance system according to the fourth embodiment. In the description of FIG. 20, those corresponding to the components of the driver assistance systems according to the first embodiment to the third embodiment will be given the same reference numerals, and description thereof will be omitted.

The driver assistance system according to the fourth embodiment has a vehicle control unit 14. The vehicle control unit 14 controls the operation of the own-vehicle when a visibility determination unit 21 determines that there is a strong possibility of a collision on the basis of the travel direction of the own-vehicle and the travel direction of the other-vehicle. The vehicle control unit 14 controls, for example, a seat belt and brakes.

Figure 21:
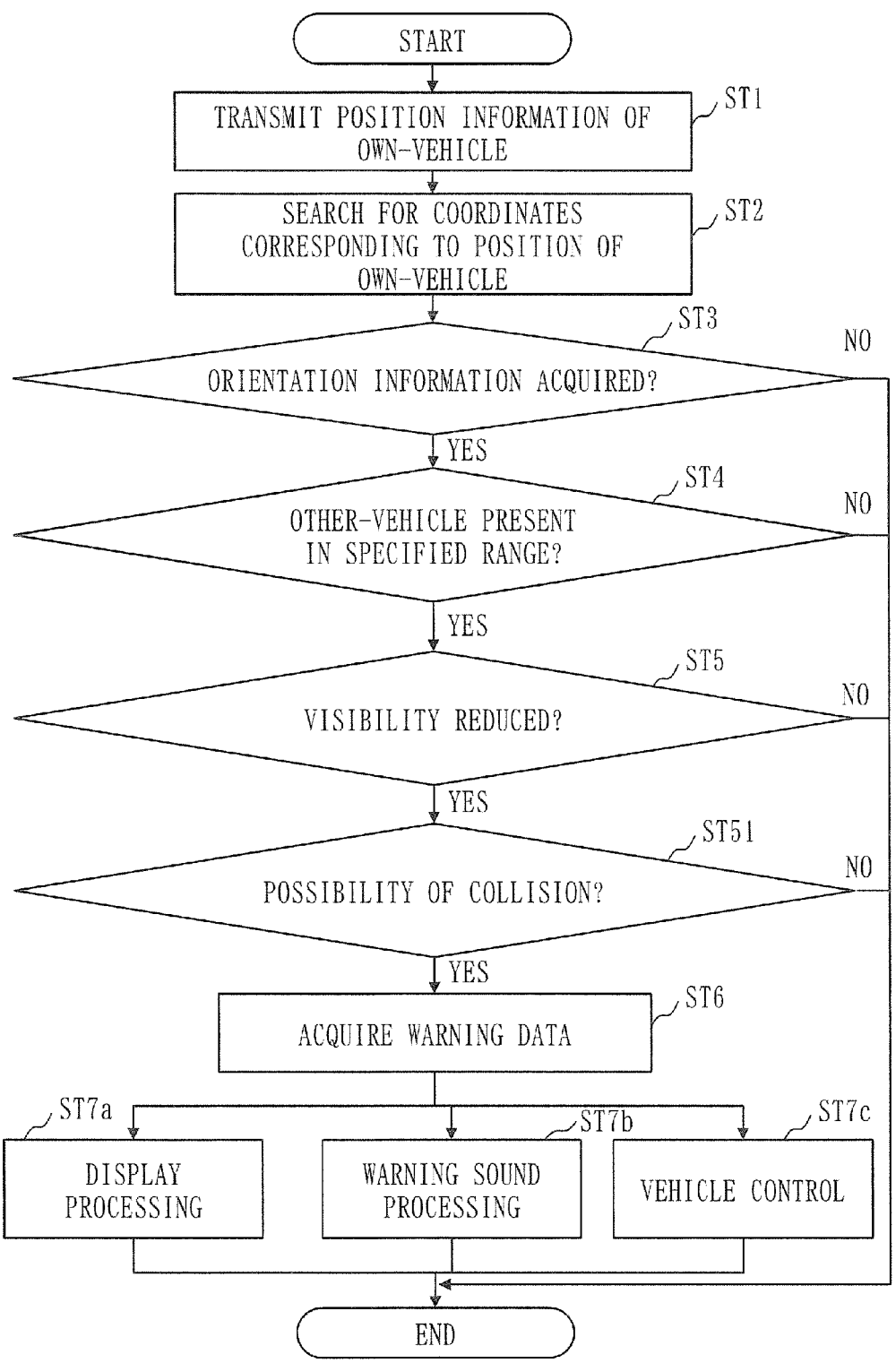
FIG. 21 is a flowchart of the operation of the driver assistance system according to the fourth embodiment.

The operation of the driver assistance system according to the fourth embodiment will now be described with reference to FIG. 21. FIG. 21 is a flowchart of the operation of the driver assistance system according to the fourth embodiment. In the description of FIG. 21, those corresponding to the operational steps of the driver assistance systems according to the first embodiment to the third embodiment will be given the same reference numerals, and description thereof will be omitted. In the description of FIG. 21, it is assumed that in ST1 to ST6, the own-vehicle determines at the intersection that the visibility of the other-vehicle behind is reduced, further determines that there is a possibility that the other-vehicle behind may collide with the own-vehicle, and displays the warning image, as described with reference to FIG. 18, and ST7c will be described.

In ST7c, if the visibility determination unit 21 has determined that there is a possibility that the vehicle behind may collide with the own-vehicle, the vehicle control unit 14 tightens the seat belt to reduce an impact applied upon the collision with the vehicle behind. The vehicle control unit 14 also performs control to forcibly apply the brakes to prevent the own-vehicle from springing forward by the impact of the collision.

As described above, the driver assistance system according to the fourth embodiment controls the operation of the own-vehicle if it is determined that there is a possibility that the own-vehicle and the other-vehicle may collide. Therefore, it is possible to detect that the visibility is reduced and to reduce damage when the own-vehicle and the other-vehicle collide.

Fifth Embodiment

The driver assistance system according to the first embodiment transmits the position information of the own-vehicle and the travel direction information of the own-vehicle to the server 7 to have them stored therein if the visibility reduction spot determination device 10 determines that the visibility of the driver in the own-vehicle is reduced. However, in the driver assistance system, if the position information of the own-vehicle and the travel direction information of the own-vehicle are stored in the server 7 every time the visibility reduction spot determination device 10 determines that the visibility of the driver in the own-vehicle is reduced, there is a risk that an enormous amount of data may be stored. Therefore, a driver assistance system according to a fifth embodiment is characterized in that at a specified spot such as an intersection, for example, the driver assistance system transmits the position information of the own-vehicle and the travel direction information of the own-vehicle to a server 7, and at a spot other than the specified spot, such as a straight road, transmits the position information of the own-vehicle and the travel direction information of the own-vehicle to the server 7 when the driver in the own-vehicle is exposed to light reflecting off a building or the like.

Figure 22:
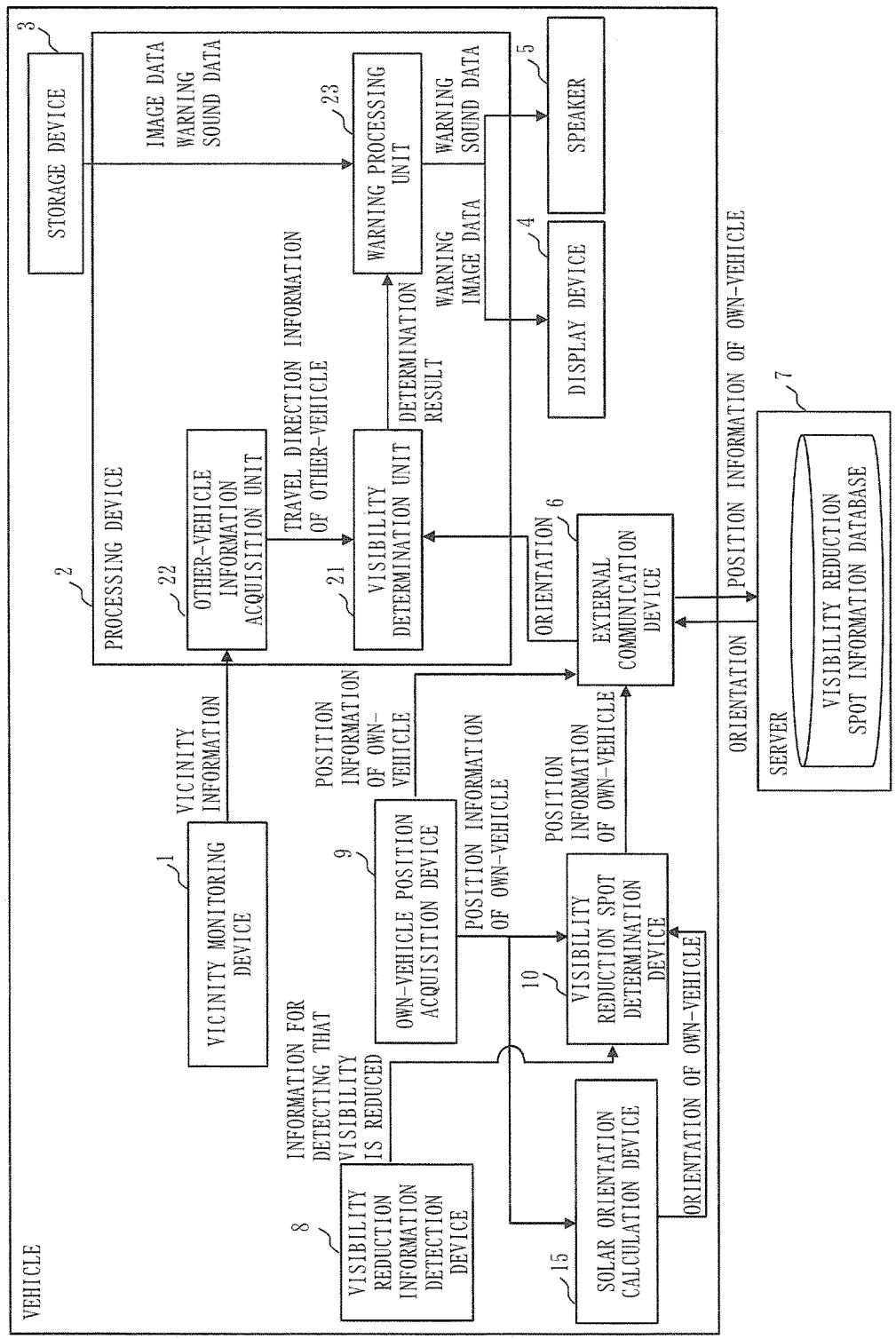
FIG. 22 is a functional block diagram of a driver assistance system according to a fifth embodiment.

The configuration of the driver assistance system according to the fifth embodiment will be described below with reference to FIG. 22. FIG. 22 is a functional block diagram of the driver assistance system according to the fifth embodiment. In the description of FIG. 22, those corresponding to the components of the driver assistance system according to the first embodiment will be given the same reference numerals, and description thereof will be omitted.

With reference to FIG. 22, the driver assistance system according to the fifth embodiment has a solar orientation calculation device 15. The solar orientation calculation device 15 acquires the position of the own-vehicle from an own-vehicle position acquisition device 9, and calculates the orientation of the sun as seen from the own-vehicle on the basis of the position of the own-vehicle and the time.

In this embodiment, a visibility reduction spot determination device 10 acquires the position information of the own-vehicle from the own-vehicle position acquisition device 9, and determines whether or not the own-vehicle is located at a specified spot. If it is determined that the own-vehicle is located at the specified spot, the visibility reduction spot determination device 10 transmits the position information of the own-vehicle and the travel direction information of the own-vehicle to the server 7. The specified spot can be set arbitrarily by the designer of the driver assistance system, and corresponds to an intersection or the like, for example.

On the other hand, if it is determined that the own-vehicle is not located at the specified spot, the visibility reduction spot determination device 10 acquires the travel direction of the own-vehicle from the own-vehicle position acquisition device 9 and information on the orientation of the sun (hereinafter referred to as solar orientation information) from the solar orientation calculation device 15, and determines whether the cause by which the visibility of the driver in the own-vehicle is reduced is that the driver is directly exposed to the sunlight or that the driver is indirectly exposed to the sunlight through reflection. The visibility reduction spot determination device 10 does not transmit the position information of the own-vehicle and the travel direction information of the own-vehicle to the server 7 if the cause by which the visibility of the driver in the own-vehicle is reduced is direct exposure to the sunlight, and transmits the position information of the own-vehicle and the travel direction information of the own-vehicle if the cause is indirect exposure to the sunlight through reflection.

Figure 23:
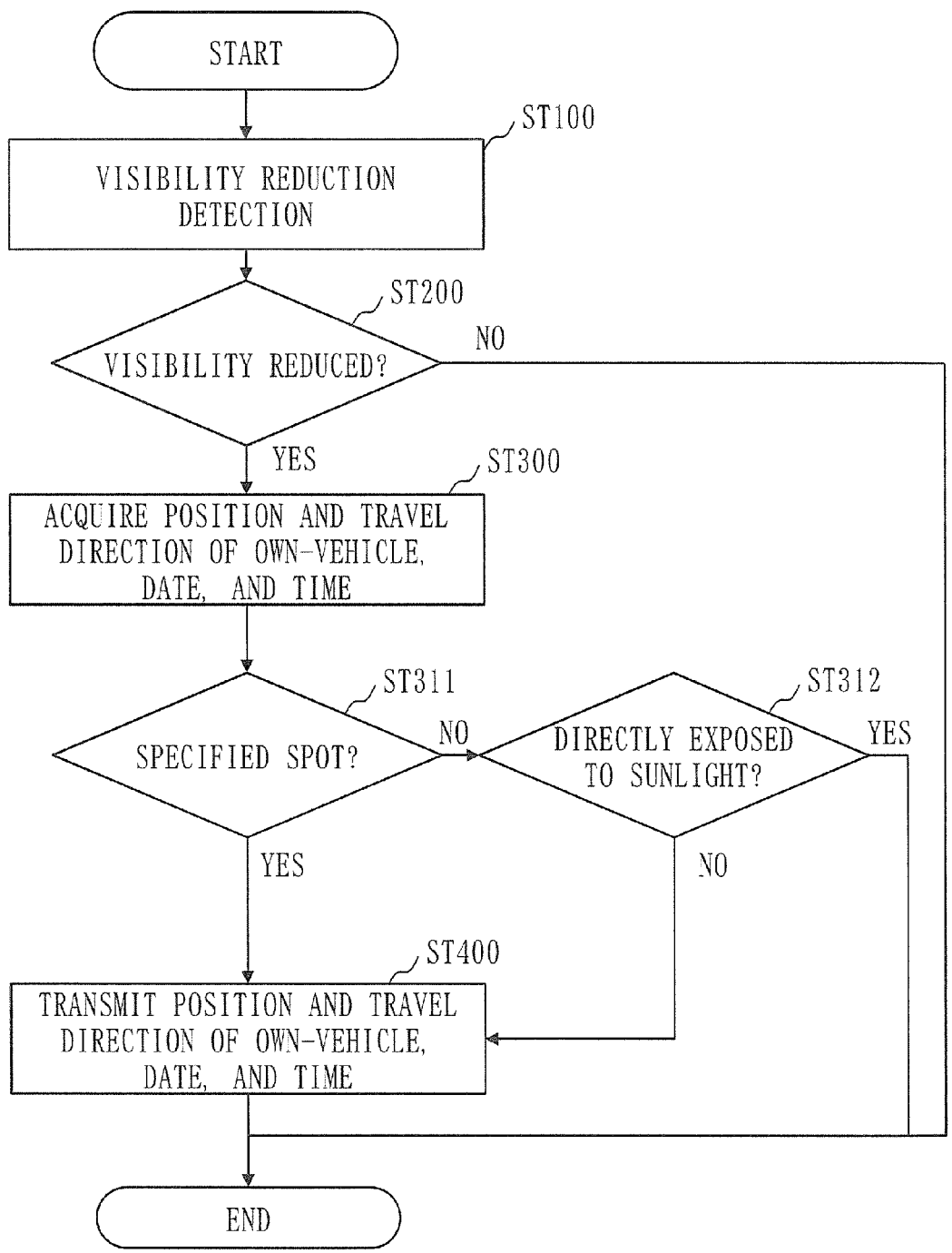
FIG. 23 is a flowchart of the operation of the driver assistance system according to the fifth embodiment.

The operation of the driver assistance system according to the fifth embodiment will be described below with reference to FIG. 23. FIG. 23 is a flowchart of the operation of the driver assistance system according to the fifth embodiment. In the description of FIG. 23, those corresponding to the operational steps of the driver assistance system according to the first embodiment will be given the same reference numerals, and description thereof will be omitted. In the following description, it is assumed that the specified spot is an intersection. However, the specified spot can be decided arbitrarily by the designer of the driver assistance system.

In ST311, the visibility reduction spot determination device 10 acquires information about the position of the own-vehicle from the own-vehicle position acquisition device 9, and determines whether or not the own-vehicle is located at the specified spot, that is, an intersection. If the own-vehicle is located at an intersection, processing of ST400 is executed. On the other hand, if the own-vehicle is not located at an intersection, for example, when the own-vehicle is traveling on a straight road on which right and left turns cannot be made, the visibility reduction spot determination device 10 executes processing of ST312.

In ST312, the solar orientation calculation device 15 acquires the information about the position of the own-vehicle from the own-vehicle position acquisition device 9. The solar orientation calculation device 15 calculates the orientation of the sun on the basis of the information about the position of the own-vehicle and the current time.

Then, the visibility reduction spot determination device 10 acquires the travel direction of the own-vehicle from the own-vehicle position acquisition device 9, acquires the solar orientation information from the solar orientation calculation device 15, and determines whether or not the travel direction of the own-vehicle coincides with the orientation of the sun. If the travel direction of the own-vehicle coincides with the orientation of the sun, the visibility reduction spot determination device 10 determines that the cause by which the visibility of the driver in the own-vehicle is reduced is direct exposure to the sunlight. On the other hand, if the travel direction of the own-vehicle does not coincide with the orientation of the sun, the visibility reduction spot determination device 10 determines that the cause by which the visibility of the driver in the own-vehicle is reduced is the sunlight reflecting off a building or the like. If it is determined that the cause by which the visibility of the driver in the own-vehicle is reduced is direct exposure to the sunlight, the driver assistance system ends the processing. If it is determined that that the cause by which the visibility of the driver in the own-vehicle is reduced is the sunlight reflecting off a building or the like, the driver assistance system performs ST400.

In ST400, the visibility reduction spot determination device 10 transmits the position information of the own-vehicle, the travel direction information of the own-vehicle, information on the date, and information on the time acquired in ST300 to the server 7 via the external communication device 6. The server 7 stores the position information of the own-vehicle, the travel direction information of the own-vehicle, the information on the date, and the information on the time in a visibility reduction spot information database.

As described above, the driver assistance system according to the fifth embodiment determines whether the cause by which the visibility of the driver in the own-vehicle is reduced is that the driver is directly exposed to the sunlight or that the driver is indirectly exposed to the sunlight through reflection, on the basis of the travel direction of the own-vehicle and the solar orientation information. If it is determined that the cause is indirect exposure to the sunlight through reflection, the driver assistance system transmits the position information of the own-vehicle and the travel direction information of the own-vehicle, so that the amount of information on visibility reduction spots stored in the server 7 can be reduced. For example, when the own-vehicle is traveling on a straight road on which right and left turns cannot be made and the relation between the travel direction of the own-vehicle and the orientation of the sun as seen from the position of the own-vehicle remain unchanged for a long period of time, the driver assistance system according to the first embodiment stores the position information of the own-vehicle and the travel direction information of the travel direction information in the server 7 a plurality of times, causing an enormous amount of data to be stored. The driver assistance system according to this embodiment transmits the position information of the own-vehicle and the travel direction information of the own-vehicle to the server 7 when the visibility of the driver is reduced because of indirect exposure to light through reflection of the sunlight, so that the amount of data stored in the server 7 can be reduced.

REFERENCE SIGNS LIST

1: vicinity monitoring device, 2: processing device, 3: storage device, 4: display device, 5: speaker. 6: external communication device, 7: server, 8: visibility reduction information detection device, 9: own-vehicle position acquisition device, 10: visibility reduction spot determination device, 12: driving monitoring device, 14: vehicle control unit, 15: solar orientation calculation device, 21: visibility determination unit, 22: other-vehicle information acquisition unit, 23: warning processing unit, 24: own-vehicle position information acquisition unit, 81: on-board camera, 82: line-of-sight detection unit, 83: sun visor sensor, 101: image analysis unit, 103: determination unit, 831: sun visor orientation sensor, 834: sun visor use determination sensor, 832: illumination sensor

The invention claimed is:
1. A driver assistance system that is mounted on an own-vehicle, the driver assistance system comprising:
processing circuitry to:
acquire travel direction information indicating a travel direction of an other-vehicle;
store a spot where visibility of a driver in said own-vehicle is reduced and information on a direction, associated with the spot, in which the visibility of the driver in the own-vehicle is reduced, in association with each other;
determine whether or not visibility of a driver in the other-vehicle is reduced on a basis of the acquired travel direction information of the other-vehicle and the stored information on the direction in which the visibility is reduced; and if it is determined that the visibility of the driver in the other-vehicle is reduced, warn a driver of the own-vehicle that the visibility of the driver in the other-vehicle is reduced, wherein the processing circuitry determines a possibility of a collision between the own-vehicle and the other-vehicle on a basis of travel direction information of the own-vehicle and the acquired travel direction information of the other-vehicle, and if it is determined that there is the possibility of the collision, warns that the visibility of the driver in the other-vehicle is reduced.

2. The driver assistance system according to claim 1, wherein the processing circuitry acquires position information of the other-vehicle, and determines, using the acquired position information, whether or not the visibility of the driver in the other-vehicle is reduced, the other-vehicle traveling within a specified range from the own-vehicle.

3. The driver assistance system according to claim 1, wherein the processing circuitry acquires position information of the other-vehicle, and determines whether or not the visibility of the driver in the other-vehicle is reduced on a basis of the stored spot where the visibility is reduced, the spot where the visibility is reduced existing within a specified range from a position of the other-vehicle.

4. The driver assistance system according to claim 3, wherein the processing circuitry determines a direction in which the visibility of the driver in the other-vehicle is reduced on a basis of information on a road on which the other-vehicle is allowed to travel and the travel direction information of the other-vehicle, and warns the driver of the own-vehicle about the direction in which the visibility is reduced.

5. The driver assistance system according to claim 2, wherein the processing circuitry controls operation of the own-vehicle if it is determined that there is a possibility of a collision between the own-vehicle and the other-vehicle.

6. A driver assistance system comprising:
processing circuitry to:
determine whether or not visibility of a driver in a vehicle is reduced, and when the visibility of the driver in the vehicle is reduced, output position information of the vehicle and travel direction information of the vehicle;

store the position information of the vehicle and the travel direction information of the vehicle that are output, in association with each other; and calculate an orientation of the sun, wherein when the visibility of the driver in the vehicle is reduced and the vehicle is traveling at a particular spot, the processing circuitry outputs the position information of the vehicle and the travel direction information of the vehicle, and when the visibility of the driver in the vehicle is reduced and the vehicle is traveling at a spot other than the particular spot, the processing circuitry determines whether or not the driver is directly exposed to light of the sun on a basis of information on the orientation of the sun and the travel direction information of the vehicle, and if the driver is directly exposed to the light of the sun, outputs the position information of the vehicle and the travel direction information of the vehicle.

7. A driver assistance system that is mounted on an own-vehicle, the driver assistance system comprising:
processing circuitry to:
acquire travel direction information indicating a travel direction of an other-vehicle;

determine whether or not visibility of a driver in the other-vehicle is reduced on a basis of the acquired travel direction information of the other-vehicle and information on a direction in which visibility is reduced; and if it is determined that the visibility of the driver in the other-vehicle is reduced, warn a driver of the own-vehicle that the visibility of the driver in the other-vehicle is reduced, wherein the processing circuitry determines a possibility of a collision between the own-vehicle and the other-vehicle on a basis of travel direction information of the own-vehicle and travel direction information of the other-vehicle, and if it is determined that there is the possibility of the collision, warns that the visibility of the driver in the other-vehicle is reduced.

* * * * *